(12) United States Patent
Chen et al.

(10) Patent No.: US 8,014,080 B1
(45) Date of Patent: Sep. 6, 2011

(54) OPTICAL PHOTOGRAPHING SYSTEM

(75) Inventors: Chun Shan Chen, Taichung (TW);
Tsung Han Tsai, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/953,747

(22) Filed: Nov. 24, 2010

(30) Foreign Application Priority Data

Oct. 13, 2010 (TW) ................................ 99134902 A

(51) Int. Cl.
 *G02B 3/02* (2006.01)
 *G02B 13/18* (2006.01)
(52) U.S. Cl. ........ 359/715; 359/644; 359/650; 359/738; 359/740; 359/771; 359/772
(58) Field of Classification Search .................. 359/644, 359/650, 715, 738, 740, 771, 772
See application file for complete search history.

(56) References Cited

U.S. PATENT DOCUMENTS

| 7,365,920 | B2 | 4/2008 | Noda | |
|---|---|---|---|---|
| 7,848,032 | B1 * | 12/2010 | Chen et al. | 359/715 |
| 7,869,142 | B2 * | 1/2011 | Chen et al. | 359/715 |

* cited by examiner

*Primary Examiner* — Evelyn A. Lester
(74) *Attorney, Agent, or Firm* — Morris Manning Martin LLP; Tim Tingkang Xia, Esq.

(57) ABSTRACT

This invention provides an optical photographing system comprising four lens elements with refractive power, in order from an object side to an image side: a first lens element; a second lens element with positive refractive power, and at least one of the object-side and image-side surfaces thereof being aspheric; a third lens element with negative refractive power having a concave object-side surface and a convex image-side surface, and both of the object-side and image-side surfaces thereof being aspheric; a fourth lens element with positive refractive power, and both of the object-side and image-side surfaces thereof being aspheric; wherein the optical photographing system further comprises an aperture stop positioned between an object and the second lens element. By such arrangement, total track length of the optical photographing system can be effectively reduced. Wide view-angle and high image resolution are also obtained.

21 Claims, 29 Drawing Sheets

| TABLE 1 |||||||
|---|---|---|---|---|---|---|
| (Embodiment 1) |||||||
| f = 4.54 mm, Fno = 2.07, HFOV= 37.1 deg. |||||||
| Surface # | | Curvature Radius | Thickness | Material | Index | Abbe # | Focal length |
| 0 | Object | Plano | Infinity | | | | |
| 1 | Lens 1 | 3.28710 (ASP) | 0.309 | Plastic | 1.632 | 23.4 | -13.56 |
| 2 | | 2.28940 (ASP) | 0.182 | | | | |
| 3 | Ape. Stop | Plano | 0.151 | | | | |
| 4 | Lens 2 | 4.19080 (ASP) | 1.420 | Plastic | 1.544 | 55.9 | 2.93 |
| 5 | | -2.26608 (ASP) | 1.202 | | | | |
| 6 | Lens 3 | -0.68837 (ASP) | 0.557 | Plastic | 1.632 | 23.4 | -3.45 |
| 7 | | -1.32175 (ASP) | 0.087 | | | | |
| 8 | Lens 4 | 1.66390 (ASP) | 1.299 | Plastic | 1.544 | 55.9 | 4.45 |
| 9 | | 3.86450 (ASP) | 0.500 | | | | |
| 10 | IR-filter | Plano | 0.300 | Glass | 1.517 | 64.2 | - |
| 11 | | Plano | 0.300 | | | | |
| 12 | Cover-glass | Plano | 0.400 | Glass | 1.517 | 64.2 | - |
| 13 | | Plano | 0.786 | | | | |
| 14 | Image | Plano | - | | | | |
| Note: Reference wavelength is d-line(587.6 nm) |||||||

Fig.8

| TABLE 2 | | | | |
|---|---|---|---|---|
| Aspheric Coefficients | | | | |
| Surface # | 1 | 2 | 4 | 5 |
| k   = | -5.01259E+00 | -1.41213E+00 | -5.93643E+00 | -7.53769E-02 |
| A4 = | -4.75726E-02 | -7.92436E-02 | -3.32669E-02 | -1.67292E-02 |
| A6 = | 6.04726E-03 | 9.62429E-03 | -2.17666E-02 | -2.13748E-03 |
| A8 = | -3.10597E-03 | -9.48463E-03 | 3.93610E-03 | -2.07349E-03 |
| A10 = | 1.10855E-04 | 1.17155E-03 | -9.52133E-03 | |
| Surface # | 6 | 7 | 8 | 9 |
| k   = | -1.94431E+00 | -6.75445E-01 | -6.25837E+00 | -6.15613E+00 |
| A4 = | 1.56500E-02 | 8.27291E-02 | -3.53666E-03 | -1.34584E-02 |
| A6 = | 9.40933E-03 | 6.48221E-03 | 2.85482E-05 | 2.31506E-03 |
| A8 = | 2.73102E-03 | -1.55081E-03 | 5.24336E-05 | -2.22626E-04 |
| A10= | -1.30245E-03 | 2.58073E-04 | -1.22582E-05 | 4.54896E-06 |
| A12 = | 1.21890E-04 | | | |

Fig.9

| TABLE 3 | | | | | | | |
|---|---|---|---|---|---|---|---|
| (Embodiment 2) | | | | | | | |
| f = 4.11 mm, Fno = 2.40, HFOV = 39.1 deg. | | | | | | | |
| Surface # | | Curvature Radius | Thickness | Material | Index | Abbe # | Focal length |
| 0 | Object | Plano | Infinity | | | | |
| 1 | Lens 1 | 3.02870 (ASP) | 0.314 | Plastic | 1.650 | 21.4 | -33.05 |
| 2 | | 2.54590 (ASP) | 0.134 | | | | |
| 3 | Ape. Stop | Plano | 0.135 | | | | |
| 4 | Lens 2 | -31.84710 (ASP) | 0.724 | Plastic | 1.544 | 55.9 | 3.11 |
| 5 | | -1.61988 (ASP) | 1.508 | | | | |
| 6 | Lens 3 | -0.67510 (ASP) | 0.602 | Plastic | 1.650 | 21.4 | -3.88 |
| 7 | | -1.24557 (ASP) | 0.070 | | | | |
| 8 | Lens 4 | 1.58670 (ASP) | 1.054 | Plastic | 1.544 | 55.9 | 4.36 |
| 9 | | 3.67710 (ASP) | 0.500 | | | | |
| 10 | IR-filter | Plano | 0.300 | Glass | 1.517 | 64.2 | - |
| 11 | | Plano | 0.300 | | | | |
| 12 | Cover-glass | Plano | 0.400 | Glass | 1.517 | 64.2 | - |
| 13 | | Plano | 0.532 | | | | |
| 14 | Image | Plano | - | | | | |
| Note: Reference wavelength is d-line(587.6 nm) | | | | | | | |

Fig.10

| TABLE 4 | | | | |
|---|---|---|---|---|
| Aspheric Coefficients | | | | |
| Surface # | 1 | 2 | 4 | 5 |
| k = | -3.83366E+00 | 6.05012E-01 | 1.00000E+00 | -1.77487E-01 |
| A4 = | -5.52609E-02 | -6.59567E-02 | -4.85937E-02 | -2.43758E-02 |
| A6 = | -2.08091E-02 | -2.79863E-02 | -4.07813E-02 | -3.83364E-03 |
| A8 = | -2.33961E-02 | -5.06215E-02 | -9.66708E-03 | -1.99388E-02 |
| A10 = | 1.60933E-05 | 1.71676E-02 | -4.56392E-02 | |
| Surface # | 6 | 7 | 8 | 9 |
| k = | -1.97398E+00 | -6.32950E-01 | -5.20422E+00 | -7.30414E+00 |
| A4 = | 1.68154E-02 | 7.92064E-02 | -6.71620E-03 | -9.59159E-03 |
| A6 = | 1.45861E-02 | 8.17551E-03 | -2.65346E-06 | 8.19770E-04 |
| A8 = | 3.70781E-03 | -7.72460E-04 | 5.87614E-05 | -1.92988E-05 |
| A10= | -1.94445E-03 | 3.68100E-04 | -5.69372E-06 | -4.31819E-06 |
| A12 = | 9.61498E-05 | | | |

Fig.11

| TABLE 5 | | | | | | |
|---|---|---|---|---|---|---|
| (Embodiment 3) | | | | | | |
| f = 4.34 mm, Fno = 2.40, HFOV = 38.2 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.056 | | | | |
| 2 | Lens 1 | 3.92330 (ASP) | 0.320 | Plastic | 1.544 | 55.9 | -12.42 |
| 3 | | 2.41081 (ASP) | 0.215 | | | | |
| 4 | Lens 2 | 3.04410 (ASP) | 1.297 | Plastic | 1.544 | 55.9 | 2.67 |
| 5 | | -2.35946 (ASP) | 0.941 | | | | |
| 6 | Lens 3 | -0.68946 (ASP) | 0.551 | Plastic | 1.632 | 23.4 | -3.20 |
| 7 | | -1.37018 (ASP) | 0.101 | | | | |
| 8 | Lens 4 | 1.66445 (ASP) | 1.500 | Plastic | 1.544 | 55.9 | 4.46 |
| 9 | | 3.62180 (ASP) | 0.800 | | | | |
| 10 | IR-filter | Plano | 0.300 | Glass | 1.517 | 64.2 | - |
| 11 | | Plano | 0.300 | | | | |
| 12 | Cover-glass | Plano | 0.400 | Glass | 1.517 | 64.2 | - |
| 13 | | Plano | 0.242 | | | | |
| 14 | Image | Plano | - | | | | |
| Note: Reference wavelength is d-line(587.6 nm) | | | | | | | |

Fig.12

| TABLE 6 | | | | |
|---|---|---|---|---|
| Aspheric Coefficients | | | | |
| Surface # | 2 | 3 | 4 | 5 |
| k = | -6.76700E+00 | -1.01052E+00 | -1.03686E-01 | -1.99515E-01 |
| A4 = | -5.23581E-02 | -8.32662E-02 | -3.89545E-02 | -1.70087E-02 |
| A6 = | 7.20618E-03 | -7.90233E-03 | -1.95494E-02 | -1.83603E-04 |
| A8 = | -1.28690E-02 | -5.38373E-04 | 4.83933E-04 | -3.75427E-03 |
| A10 = | 5.01300E-03 | -2.39390E-03 | -8.00467E-03 | |
| Surface # 表面 | 6 | 7 | 8 | 9 |
| k = | -1.96195E+00 | -6.45592E-01 | -6.41005E+00 | -1.41260E+00 |
| A4 = | 2.08276E-02 | 8.38468E-02 | -6.84028E-03 | -1.96256E-02 |
| A6 = | 1.18565E-02 | 9.60184E-03 | 1.76627E-04 | 1.96244E-03 |
| A8 = | 2.48625E-03 | -1.08187E-03 | 9.26531E-05 | -1.00720E-04 |
| A10= | -1.51480E-03 | 2.62214E-05 | -1.48661E-05 | -1.49358E-06 |
| A12 = | 1.45973E-04 | | | |

Fig.13

| TABLE 7 | | | | | | | |
|---|---|---|---|---|---|---|---|
| (Embodiment 4) | | | | | | | |
| f = 5.06 mm, Fno = 1.85, HFOV= 33.4 deg. | | | | | | | |
| Surface # | | Curvature Radius | Thickness | Material | Index | Abbe # | Focal length |
| 0 | Object | Plano | Infinity | | | | |
| 1 | Lens 1 | 2.35200 (ASP) | 0.350 | Plastic | 1.634 | 23.8 | -12.16 |
| 2 | | 1.69828 (ASP) | 0.438 | | | | |
| 3 | Ape. Stop | Plano | -0.105 | | | | |
| 4 | Lens 2 | 2.71541 (ASP) | 1.288 | Plastic | 1.514 | 56.8 | 3.41 |
| 5 | | -4.14840 (ASP) | 1.592 | | | | |
| 6 | Lens 3 | -0.69230 (ASP) | 0.340 | Plastic | 1.634 | 23.8 | -4.02 |
| 7 | | -1.13210 (ASP) | 0.070 | | | | |
| 8 | Lens 4 | 1.60707 (ASP) | 1.700 | Plastic | 1.514 | 56.8 | 4.24 |
| 9 | | 3.93250 (ASP) | 0.500 | | | | |
| 10 | IR-filter | Plano | 0.300 | Glass | 1.517 | 64.2 | - |
| 11 | | Plano | 0.300 | | | | |
| 12 | Cover-glass | Plano | 0.400 | Glass | 1.517 | 64.2 | - |
| 13 | | Plano | 0.441 | | | | |
| 14 | Image | Plano | - | | | | |
| Note: Reference wavelength is d-line(587.6 nm) | | | | | | | |

Fig.14

| TABLE 8 | | | | |
|---|---|---|---|---|
| Aspheric Coefficients | | | | |
| Surface # | 1 | 2 | 4 | 5 |
| k = | -2.04930E+00 | -9.38907E-01 | -8.91863E-01 | -2.58667E-01 |
| A4 = | -4.08180E-02 | -7.20292E-02 | -1.79948E-02 | -1.59706E-02 |
| A6 = | 5.90936E-03 | 1.15276E-02 | -7.75708E-03 | -7.01760E-04 |
| A8 = | -2.58995E-03 | -5.70934E-03 | 1.44145E-03 | -1.63897E-03 |
| A10 = | 4.36183E-04 | 9.83188E-04 | -1.69273E-03 | |
| Surface # | 6 | 7 | 8 | 9 |
| k = | -2.05071E+00 | -7.37743E-01 | -9.35451E+00 | -1.20555E+00 |
| A4 = | -1.50671E-03 | 9.36444E-02 | -4.80539E-03 | -2.06466E-02 |
| A6 = | 1.00183E-02 | 6.24022E-03 | -8.47331E-04 | 2.17685E-03 |
| A8 = | 3.13244E-03 | -1.06120E-03 | 1.36880E-04 | -2.58306E-04 |
| A10= | -1.15842E-03 | 3.54869E-04 | -3.65520E-05 | 7.81732E-06 |
| A12 = | 9.30516E-05 | | | |

Fig.15

| TABLE 9 | | | | | | |
|---|---|---|---|---|---|---|
| (Embodiment 5) | | | | | | |
| f = 3.44 mm, Fno = 2.81, HFOV = 37.6 deg. | | | | | | |
| Surface # | | Curvature Radius | Thickness | Material | Index | Abbe # | Focal length |
| 0 | Object | Plano | Infinity | | | | |
| 1 | Lens 1 | 1.93853 (ASP) | 0.516 | Plastic | 1.543 | 56.5 | -171.12 |
| 2 | | 1.72098 (ASP) | 0.168 | | | | |
| 3 | Ape. Stop | Plano | 0.050 | | | | |
| 4 | Lens 2 | 3.12360 (ASP) | 1.175 | Plastic | 1.530 | 55.8 | 1.75 |
| 5 | | -1.14442 (ASP) | 0.327 | | | | |
| 6 | Lens 3 | -0.46527 (ASP) | 0.556 | Plastic | 1.583 | 30.2 | -1.80 |
| 7 | | -1.20526 (ASP) | 0.070 | | | | |
| 8 | Lens 4 | 1.50364 (ASP) | 0.981 | Plastic | 1.530 | 55.8 | 3.48 |
| 9 | | 6.27330 (ASP) | 0.350 | | | | |
| 10 | IR-filter | Plano | 0.300 | Glass | 1.517 | 64.2 | - |
| 11 | | Plano | 0.350 | | | | |
| 12 | Cover-glass | Plano | 0.500 | Glass | 1.517 | 64.2 | - |
| 13 | | Plano | 0.473 | | | | |
| 14 | Image | Plano | - | | | | |
| Note: Reference wavelength is d-line(587.6 nm) | | | | | | | |

Fig.16

| TABLE 10 | | | | |
|---|---|---|---|---|
| Aspheric Coefficients | | | | |
| Surface # | 1 | 2 | 4 | 5 |
| k    = | -2.01374E+00 | -1.17612E+00 | -8.47976E-01 | -2.00000E-01 |
| A4 = | 1.95052E-02 | -3.11311E-02 | -9.57531E-02 | -9.27608E-02 |
| A6 = | -1.62817E-02 | -1.95406E-01 | -3.83492E-01 | 3.68639E-02 |
| A8 = | 3.74820E-02 | 3.35823E-01 | 7.31622E-01 | -2.38756E-03 |
| A10 = | -4.44690E-02 | -7.29540E-01 | -1.76544E+00 | -6.83017E-03 |
| A12 = | 4.19729E-08 | 4.38783E-09 | 4.30310E-09 | 4.29504E-09 |
| Surface # | 6 | 7 | 8 | 9 |
| k    = | -1.55866E+00 | -5.15252E-01 | -6.65581E+00 | -1.50139E+01 |
| A4 = | 4.37000E-02 | 1.98671E-01 | -1.26285E-02 | -7.25624E-03 |
| A6 = | 2.10531E-02 | 2.38394E-02 | 3.36034E-03 | -8.54376E-04 |
| A8 = | 7.27488E-02 | -2.07147E-02 | -1.36899E-03 | -2.41043E-04 |
| A10= | 1.75148E-02 | 5.93938E-03 | 8.06300E-05 | 1.16484E-05 |
| A12 = | -2.75238E-02 | -6.93998E-05 | -3.11537E-06 | -4.50028E-06 |

Fig.17

| TABLE 11 | | | | | | | |
|---|---|---|---|---|---|---|---|
| (Embodiment 6) | | | | | | | |
| f = 4.28 mm, Fno = 2.40, HFOV = 37.9 deg. | | | | | | | |
| Surface # | | Curvature Radius | Thickness | Material | Index | Abbe # | Focal length |
| 0 | Object | Plano | Infinity | | | | |
| 1 | Lens 1 | -26.92460 (ASP) | 0.349 | Plastic | 1.632 | 23.4 | 17.13 |
| 2 | | -7.76000 (ASP) | 0.070 | | | | |
| 3 | Ape. Stop | Plano | 0.331 | | | | |
| 4 | Lens 2 | 13.36520 (ASP) | 1.365 | Plastic | 1.544 | 55.9 | 3.86 |
| 5 | | -2.40053 (ASP) | 0.871 | | | | |
| 6 | Lens 3 | -0.68248 (ASP) | 0.654 | Plastic | 1.650 | 21.4 | -3.15 |
| 7 | | -1.41052 (ASP) | 0.070 | | | | |
| 8 | Lens 4 | 1.80185 (ASP) | 2.250 | Plastic | 1.544 | 55.9 | 4.09 |
| 9 | | 5.31320 (ASP) | 0.500 | | | | |
| 10 | IR-filter | Plano | 0.300 | Glass | 1.517 | 64.2 | - |
| 11 | | Plano | 0.300 | | | | |
| 12 | Cover-glass | Plano | 0.400 | Glass | 1.517 | 64.2 | - |
| 13 | | Plano | 0.257 | | | | |
| 14 | Image | Plano | - | | | | |
| Note: Reference wavelength is d-line(587.6 nm) | | | | | | | |

Fig.18

| TABLE 12 | | | | |
|---|---|---|---|---|
| Aspheric Coefficients | | | | |
| Surface # | 1 | 2 | 4 | 5 |
| k = | -5.00000E+01 | -1.00000E+00 | 1.00000E+00 | -1.12777E+00 |
| A4 = | -1.79378E-02 | -6.21780E-03 | -4.13793E-04 | -1.32423E-02 |
| A6 = | 4.60822E-03 | 1.76896E-03 | -1.68136E-02 | -8.86491E-06 |
| A8 = | -1.13722E-02 | -2.06358E-02 | 4.18349E-03 | -1.98930E-03 |
| A10 = | 6.45520E-04 | 5.58703E-03 | -6.80524E-03 | |
| Surface # | 6 | 7 | 8 | 9 |
| k = | -1.92618E+00 | -6.40774E-01 | -7.40744E+00 | -1.42429E+01 |
| A4 = | 1.94221E-02 | 6.77887E-02 | -4.04693E-03 | -6.10683E-03 |
| A6 = | 8.32022E-03 | 5.73241E-03 | -4.79945E-04 | 8.21498E-04 |
| A8 = | 2.77527E-03 | -1.09407E-03 | 1.53952E-04 | -4.21778E-05 |
| A10= | -1.17540E-03 | 3.12511E-04 | -1.66159E-05 | -2.55245E-06 |
| A12 = | 1.01566E-04 | | | |

Fig.19

| TABLE 13 | | | | | | |
|---|---|---|---|---|---|---|
| (Embodiment 7) | | | | | | |
| f = 3.46 mm, Fno = 2.81, HFOV = 37.5 deg. | | | | | | |
| Surface # | | Curvature Radius | Thickness | Material | Index | Abbe # | Focal length |
| 0 | Object | Plano | Infinity | | | | |
| 1 | Lens 1 | 2.05307 (ASP) | 0.644 | Plastic | 1.543 | 56.5 | 8.58 |
| 2 | | 3.26380 (ASP) | 0.132 | | | | |
| 3 | Ape. Stop | Plano | 0.132 | | | | |
| 4 | Lens 2 | -55.55560 (ASP) | 1.033 | Plastic | 1.543 | 56.5 | 2.03 |
| 5 | | -1.08909 (ASP) | 0.284 | | | | |
| 6 | Lens 3 | -0.48542 (ASP) | 0.518 | Plastic | 1.583 | 30.2 | -1.93 |
| 7 | | -1.18926 (ASP) | 0.070 | | | | |
| 8 | Lens 4 | 1.58136 (ASP) | 1.400 | Plastic | 1.543 | 56.5 | 3.77 |
| 9 | | 4.76400 (ASP) | 0.260 | | | | |
| 10 | IR-filter | Plano | 0.300 | Glass | 1.517 | 64.2 | - |
| 11 | | Plano | 0.350 | | | | |
| 12 | Cover-glass | Plano | 0.500 | Glass | 1.517 | 64.2 | - |
| 13 | | Plano | 0.303 | | | | |
| 14 | Image | Plano | - | | | | |
| Note: Reference wavelength is d-line(587.6 nm) | | | | | | | |

Fig.20

| TABLE 14 | | | | |
|---|---|---|---|---|
| Aspheric Coefficients | | | | |
| Surface # | 1 | 2 | 4 | 5 |
| k = | -5.21652E-01 | -1.44236E+00 | -1.00000E+00 | -2.11626E-01 |
| A4 = | 3.42739E-02 | -3.06847E-02 | -1.56347E-01 | -1.84664E-01 |
| A6 = | -3.60103E-02 | 1.13551E-01 | -7.52809E-01 | 5.85665E-02 |
| A8 = | 9.98894E-02 | -1.18089E+00 | 1.93452E+00 | 7.73039E-02 |
| A10 = | -9.77043E-02 | 1.13757E+00 | -5.27109E+00 | -1.07831E-01 |
| A12 = | 3.68301E-04 | 6.66863E-06 | 2.03567E-07 | -1.26758E-04 |
| Surface # | 6 | 7 | 8 | 9 |
| k = | -1.47631E+00 | -5.08750E-01 | -6.91662E+00 | -4.05107E+00 |
| A4 = | 5.67021E-02 | 2.14440E-01 | -2.29662E-02 | -1.93654E-02 |
| A6 = | 3.94413E-02 | 9.65001E-03 | -1.35877E-04 | -1.76530E-03 |
| A8 = | 8.33093E-02 | -2.15921E-02 | -1.40839E-03 | 1.47706E-04 |
| A10= | 1.43449E-03 | 6.49944E-03 | 9.19278E-04 | 4.43112E-05 |
| A12 = | -2.76244E-02 | 2.79487E-04 | -2.61662E-04 | -1.25490E-05 |

Fig.21

| TABLE 15 | | | | | | | |
|---|---|---|---|---|---|---|---|
| | Embodiment 1 | Embodiment 2 | Embodiment 3 | Embodiment 4 | Embodiment 5 | Embodiment 6 | Embodiment 7 |
| f | 4.54 | 4.11 | 4.34 | 5.06 | 3.44 | 4.28 | 3.46 |
| Fno | 2.07 | 2.40 | 2.40 | 1.85 | 2.81 | 2.40 | 2.81 |
| HFOV | 37.1 | 39.1 | 38.2 | 33.4 | 37.6 | 37.9 | 37.5 |
| V4-V3 | 32.5 | 34.5 | 32.5 | 33.0 | 25.6 | 34.5 | 26.3 |
| (T12+T34)/T23 | 0.35 | 0.22 | 0.34 | 0.25 | 0.88 | 0.54 | 1.18 |
| T12/T23 | 0.28 | 0.18 | 0.23 | 0.21 | 0.67 | 0.46 | 0.93 |
| CT1/CT2 | 0.22 | 0.43 | 0.25 | 0.27 | 0.44 | 0.26 | 0.62 |
| |R4/R3| | 0.54 | 0.05 | 0.78 | 1.53 | 0.37 | 0.18 | 0.02 |
| (R5+R6)/(R5-R6) | -3.17 | -3.37 | -3.03 | -4.15 | -2.26 | -2.87 | -2.38 |
| f/f1 | -0.33 | -0.12 | -0.35 | -0.42 | -0.02 | 0.25 | 0.40 |
| f/f2 | 1.55 | 1.32 | 1.63 | 1.48 | 1.97 | 1.11 | 1.70 |
| f/f3 | -1.32 | -1.06 | -1.36 | -1.26 | -1.91 | -1.36 | -1.79 |
| SL/TTL | 0.93 | 0.93 | 1.01 | 0.89 | 0.88 | 0.94 | 0.86 |
| Td/Imgl1 | 1.55 | 1.35 | 1.47 | 1.69 | 1.47 | 1.81 | 1.62 |

Fig.22

OPTICAL PHOTOGRAPHING SYSTEM

CROSS-REFERENCE TO RELATED APPLICATIONS

This non-provisional application claims priority under 35 U.S.C. §119(a) on Patent Application No(s). 099134902 filed in Taiwan, R.O.C. on Oct. 13, 2010, the entire contents of which are hereby incorporated by reference.

BACKGROUND OF THE INVENTION

1. Field of the Invention

The present invention relates to an optical photographing system, and more particularly, to a compact optical photographing system used in an electronic product.

2. Description of the Prior Art

The demand for compact imaging lens assembly has grown in recent years as the popularity of portable electronic products with the photographing function has increased, and the sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the current electronic products are with the trend of good function and compact appearance, there is an increasing demand for compact imaging lens assembly featuring better image quality.

A conventional high-resolution imaging lens assembly generally adopts a front aperture stop and four lens elements, wherein the first and second lens elements are mostly spherical glass lenses which are adhered together to form a doublet for correcting the chromatic aberration. The lens assembly disclosed in U.S. Pat. No. 7,365,920 serves as one such example. However, this kind of arrangement has the following disadvantages. First, the degree of freedom in arranging the lens system is curtailed due to the employment of excess number of spherical glass lenses; thus, the total track length of the system cannot be reduced easily. Second, the process of adhering glass lenses together is complicated, posing difficulties in manufacture. Moreover, as the size of imaging lens assembly are becoming smaller, assembling lens elements compactly within a limited space tend to cause unnecessary light rays to reflect too many times within a lens barrel, which will affect image quality. Thus, to improve image quality, the unnecessary light rays should be prevented from entering the image forming area.

In the light of foregoing, a need exists in the art for an optical photographing system that features better image quality, maintains a moderate total track length and is applicable to compact portable electronic products.

SUMMARY OF THE INVENTION

The present invention provides an optical photographing system comprising four lens elements with refractive power, in order from an object side to an image side: a first lens element; a second lens element with positive refractive power, and at least one of the object-side and image-side surfaces thereof being aspheric; a third lens element with negative refractive power having a concave object-side surface and a convex image-side surface, and both of the object-side and image-side surfaces thereof being aspheric; and a fourth lens element with positive refractive power, and both of the object-side and image-side surfaces thereof being aspheric; wherein the optical photographing system further comprises an aperture stop and an electronic sensor positioned on an image plane where an object is imaged, and the aperture stop is positioned between an object and the second lens element; wherein a distance on the optical axis between the object-side surface of the first lens element and the image-side surface of the fourth lens element is Td, half of the diagonal length of the effective pixel area of the electronic sensor is ImgH, an on-axis spacing between the first lens element and the second lens element is T12, an on-axis spacing between the third lens element and the fourth lens element is T34, an on-axis spacing between the second lens element and the third lens element is T23, a radius of curvature of the image-side surface of the second lens element is R4, a radius of curvature of the object-side surface of the second lens element is R3, a distance on the optical axis between the aperture stop and the image plane is SL, a distance on the optical axis between the object-side surface of the first lens element and the image plane is TTL, and they satisfy the relation:

$$0.7 < Td/ImgH < 2.0;\ 0.15 < (T12+T34)/T23 < 1.20;$$
$$0.0 < |R4/R3| < 1.55;\ \text{and}\ 0.8 < SL/TTL < 1.2.$$

On the other hand, the present invention provides an optical photographing system comprising four lens elements with refractive power, in order from an object side to an image side: a first lens element having a convex object-side surface and a concave image-side surface; a second lens element with positive refractive power having a convex image-side surface, and at least one of the object-side and image-side surfaces thereof being aspheric; a third lens element with negative refractive power having a concave object-side surface and a convex image-side surface, both of the object-side and image-side surfaces thereof being aspheric, and the third lens element is made of plastic; and a fourth lens element with positive refractive power having a convex object-side surface and a concave image-side surface, both of the object-side and image-side surfaces thereof being aspheric, the fourth lens element is made of plastic, and at least one inflection point is formed on at least one of the object-side and image-side surfaces thereof; wherein the optical photographing system further comprises an aperture stop and an electronic sensor positioned on an image plane where an object is imaged, and the aperture stop is positioned between an object and the second lens element; wherein a distance on the optical axis between the object-side surface of the first lens element and the image-side surface of the fourth lens element is Td, half of the diagonal length of the effective pixel area of the electronic sensor is ImgH, a distance on the optical axis between the aperture stop and the image plane is SL, a distance on the optical axis between the object-side surface of the first lens element and the image plane is TTL, an on-axis spacing between the first lens element and the second lens element is T12, an on-axis spacing between the second lens element and the third lens element is T23, and they satisfy the relation:

$$0.7 < Td/ImgH < 2.0;\ 0.8 < SL/TTL < 1.2;\ \text{and}\ 0.1 < T12/T23 < 1.0.$$

By such arrangement, total track length of the optical photographing system can be effectively reduced. Wide viewangle and high image resolution are also obtained.

In an optical photographing system of the present invention, the aperture stop can be positioned between an object and the first lens element or between the first lens element and the second lens element.

By the positive refractive power provided by the first lens element and the position of the aperture stop near the object-side of the optical photographing system, the total track length of the system can be effectively reduced.

Moreover, by the aforementioned arrangement, the exit pupil of the optical photographing system can be positioned away from the image plane. Therefore, light will be projected onto the electronic sensor at a nearly perpendicular angle, and this is the telecentricity of the image side. The telecentricity is very important to the photosensitivity of the solid-state sensor as it can improve the photosensitivity of the sensor and reduce the probability of the shading occurrence. Furthermore, the first, third, or fourth lens element can be provided with at least one inflection point, and thereby the angle at which the light is projected onto the sensor from the off-axis field can be effectively reduced to further correct the off-axis aberration. On the other hand, it is favorable to a property of the wide field of view as the aperture stop is positioned near the second lens element, and the distortion and the chromatic aberration of magnification can be favorably corrected. Furthermore, sensitivity of the system can be effectively reduced by such arrangement.

Therefore, the aperture stop of the optical photographing system is positioned between an object and the second lens element for obtaining a balance between the telecentricity and the wide field of view.

In an optical photographing system of the present invention, the first lens element can have positive or negative refractive power. When the first lens element has positive refractive power, it can provide part of the refractive power for the system and help to reduce the total track length of the lens system; when the first lens element has negative refractive power, the field of view can be favorably enlarged. When the first lens element has positive refractive power and the second lens element has positive refractive power, the second lens element can distribute the refractive power provided by the first lens element and the sensitivity of the system can be reduced. When first lens element has negative refractive power and the second lens element has positive refractive power, the second lens element provides the main refractive power of the system, and the total track length of the system can be reduced. The third lens element has negative refractive power, which allows the aberration produced by the second lens element with positive refractive power to be effectively corrected, as well as allows the chromatic aberration of the system to be favorably corrected. The fourth lens element has positive refractive power, which further reduces the total track length of the system for keeping the system compact.

In an optical photographing system of the present invention, when the first lens element has a convex object-side surface and a concave image-side surface, such as the first lens element has negative refractive power, the field of view of the system can be favorably enlarged; when the first lens element has a concave object-side surface and a convex image-side surface, the astigmatism of the system can be corrected favorably, and the image resolution of the system can be improved favorably. When the second lens element has a convex object-side surface and a convex image-side surface, the positive refractive power of the second lens element can be improved thereby reducing the total track length of the system; when second lens element has a concave object-side surface and a convex image-side surface, the astigmatism of the system can be corrected favorably. When the third lens element has a concave object-side surface and a convex image-side surface, the aberration of the system can be corrected effectively, and the chromatic aberration of the system can be favorably corrected. When the fourth lens element has a convex object-side surface and a concave image-side surface, the astigmatism and high order aberration of the system can be corrected favorably.

BRIEF DESCRIPTION OF THE DRAWINGS

FIG. 8 is TABLE 1 which lists the optical data of the first embodiment.

FIG. 9 is TABLE 2 which lists the aspheric surface data of the first embodiment.

FIG. 10 is TABLE 3 which lists the optical data of the second embodiment.

FIG. 11 is TABLE 4 which lists the aspheric surface data of the second embodiment.

FIG. 12 is TABLE 5 which lists the optical data of the third embodiment.

FIG. 13 is TABLE 6 which lists the aspheric surface data of the third embodiment.

FIG. 14 is TABLE 7 which lists the optical data of the fourth embodiment.

FIG. 15 is TABLE 8 which lists the aspheric surface data of the fourth embodiment.

FIG. 16 is TABLE 9 which lists the optical data of the fifth embodiment.

FIG. 17 is TABLE 10 which lists the aspheric surface data of the fifth embodiment.

FIG. 18 is TABLE 11 which lists the optical data of the sixth embodiment.

FIG. 19 is TABLE 12 which lists the aspheric surface data of the sixth embodiment.

FIG. 20 is TABLE 13 which lists the optical data of the seventh embodiment.

FIG. 21 is TABLE 14 which lists the aspheric surface data of the seventh embodiment.

FIG. 22 is TABLE 15 which lists the data of the respective embodiments resulting from the equations.

DETAILED DESCRIPTION OF THE PREFERRED EMBODIMENTS

Figure 1A:
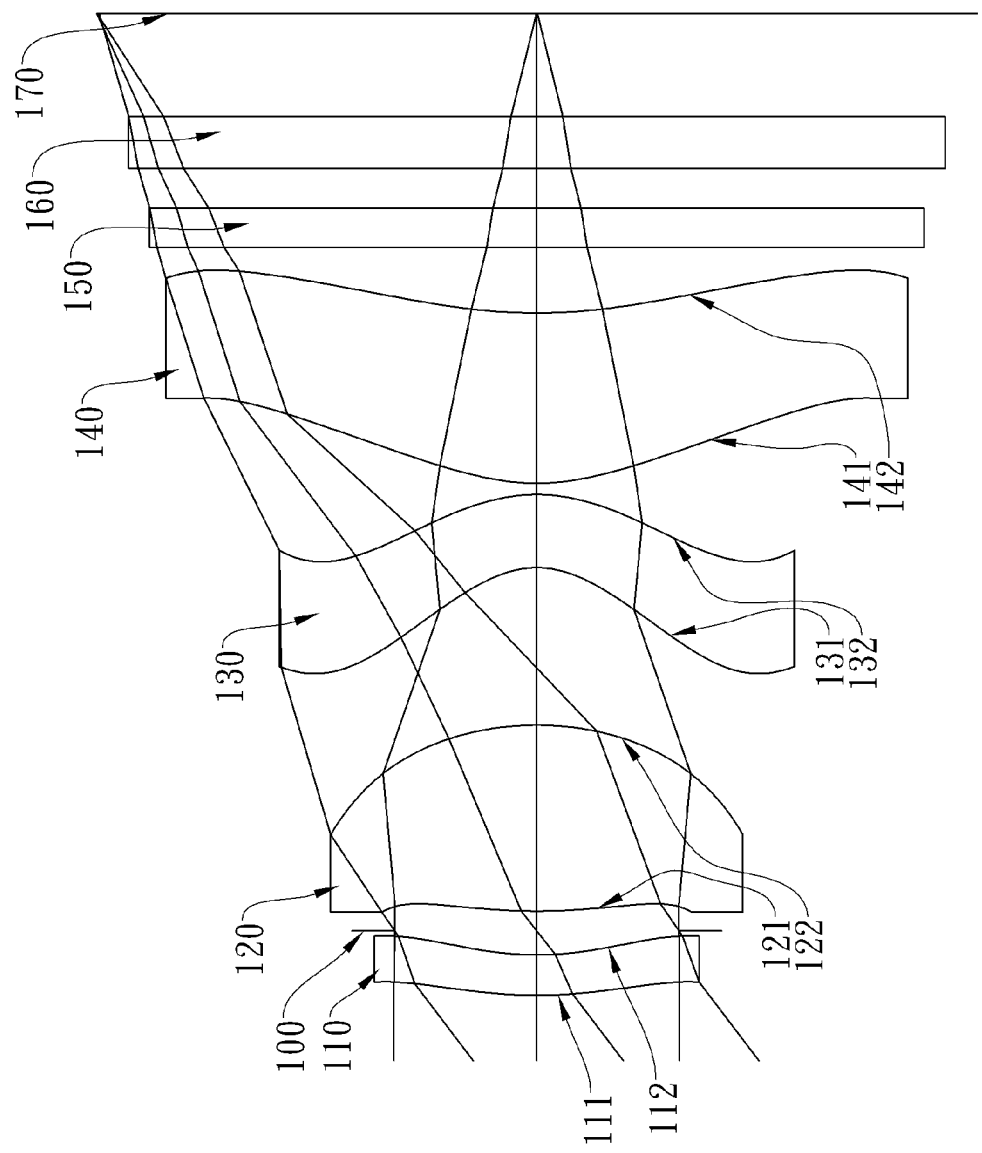
FIG. 1A shows an optical photographing system in accordance with a first embodiment of the present invention.

The present invention provides an optical photographing system comprising four lens elements with refractive power, in order from an object side to an image side: a first lens element; a second lens element with positive refractive power, and at least one of the object-side and image-side surfaces thereof being aspheric; a third lens element with negative refractive power having a concave object-side surface and a convex image-side surface, and both of the object-side and image-side surfaces thereof being aspheric; and a fourth lens element with positive refractive power, and both of the object-side and image-side surfaces thereof being aspheric; wherein the optical photographing system further comprises an aperture stop and an electronic sensor positioned on an image plane where an object is imaged, and the aperture stop is positioned between an object and the second lens element; wherein a distance on the optical axis between the object-side surface of the first lens element and the image-side surface of the fourth lens element is Td, half of the diagonal length of the effective pixel area of the electronic sensor is ImgH, an on-axis spacing between the first lens element and the second lens element is T12, an on-axis spacing between the third lens element and the fourth lens element is T34, an on-axis spacing between the second lens element and the third lens element is T23, a radius of curvature of the image-side surface of the second lens element is R4, a radius of curvature of the object-side surface of the second lens element is R3, a distance on the optical axis between the aperture stop and the image plane is SL, a distance on the optical axis between the object-side surface of the first lens element and the image plane is TTL, and they satisfy the relation:

$$0.7 < Td/ImgH < 2.0; \ 0.15 < (T12+T34)/T23 < 1.20;$$
$$0.0 < |R4/R3| < 1.55; \text{ and } 0.8 < SL/TTL < 1.2.$$

When the relation of $0.7 < Td/ImgH < 2.0$ is satisfied, the total optical track length can be favorably reduced for keeping the system compact. When the relation of $0.15 < (T12+T34)/T23 < 1.20$ is satisfied, the arrangement of each lens element is more suitable for lens assembling and keeping a proper total optical track length; preferably, the following relation is satisfied:

$$0.2 < (T12+T34)/T23 < 0.6.$$

When the relation of $0.0 < |R4/R3| < 1.55$ is satisfied, the curvature of the second lens element is not bent excessively, which is good to offer proper correction for the astigmatism of the system; preferably, the following relation is satisfied:

$$0.0 < |R4/R3| < 0.8.$$

When the relation of $0.8 < SL/TTL < 1.2$ is satisfied, the position of the aperture stop can obtain a best balance between the telecentricity and the wide field of view; preferably, the following relation is satisfied:

$$0.84 < SL/TTL < 0.97.$$

In the aforementioned optical photographing system, it is preferable that the third lens element and the fourth lens element are both made of plastic, and thereby the weight and the production cost of the lens system can be effectively reduced.

In the aforementioned optical photographing system, a focal length of the optical photographing system is f, a focal length of the first lens element is f1, and they preferably satisfy the relation:

$$0.0 < |f/f1| < 0.5.$$

When the above relation is satisfied, the refractive power of the first lens element is more proper and thereby the sensitivity is prevented from being excessively high.

In the aforementioned optical photographing system, a thickness of the first lens element on the optical axis is CT1, a thickness of the second lens element on the optical axis is CT2, and they preferably satisfy the relation:

$$0.2 < CT1/CT2 < 0.5.$$

When the above relation is satisfied, the thickness of the first lens element and the second lens element is more proper, which is favorable for lens manufacture and assembly.

In the aforementioned optical photographing system, a focal length of the optical photographing system is f, a focal length of the second lens element is f2, and they preferably satisfy the relation:

$$1.0 < f/f2 < 2.5.$$

When the above relation is satisfied, the refractive power of the second lens element is more proper and thereby the total optical track length of the system can be reduced effectively.

In the aforementioned optical photographing system, a radius of curvature of the object-side surface of the third lens element is R5, a radius of curvature of the image-side surface of the third lens element is R6, and they preferably satisfy the relation:

$$-5.0 < (R5+R6)/(R5-R6) < -2.0.$$

When the above relation is satisfied, the curvature of the third lens element is favorable for correcting the astigmatism and the aberration of the system.

In the aforementioned optical photographing system, a focal length of the optical photographing system is f, a focal length of the third lens element is f3, and they preferably satisfy the relation:

$$-2.5 < f/f3 < -1.0.$$

When the above relation is satisfied, the third lens element can be served as a correcting lens, which has the function of balancing and correcting all the aberration provided by the system and thereby a system with higher resolution can be obtained.

In the aforementioned optical photographing system, an Abbe number of the fourth lens element is V4, an Abbe number of the third lens element is V3, and they preferably satisfy the relation:

$$25 < V4-V3 < 42.$$

When the above relation is satisfied, the chromatic aberration of the system can be favorably corrected.

On the other hand, the present invention provides an optical photographing system comprising four lens elements with refractive power, in order from an object side to an image side: a first lens element having a convex object-side surface and a concave image-side surface; a second lens element with positive refractive power having a convex image-side surface, and at least one of the object-side and image-side surfaces thereof being aspheric; a third lens element with negative refractive power having a concave object-side surface and a convex image-side surface, both of the object-side and image-side surfaces thereof being aspheric, and the third lens element is made of plastic; and a fourth lens element with positive refractive power having a convex object-side surface and a concave image-side surface, both of the object-side and image-side surfaces thereof being aspheric, the fourth lens element is made of plastic, and at least one inflection point is formed on at least one of the object-side and image-side surfaces thereof; wherein the optical photographing system further comprises an aperture stop and an electronic sensor positioned on an image plane where an object is imaged, and the aperture stop is positioned between an object and the second lens element; wherein a distance on the optical axis between the object-side surface of the first lens element and the image-side surface of the fourth lens element is Td, half of the diagonal length of the effective pixel area of the electronic sensor is ImgH, a distance on the optical axis between the aperture stop and the image plane is SL, a distance on the optical axis between the object-side surface of the first lens element and the image plane is TTL, an on-axis spacing between the first lens element and the second lens element is T12, an on-axis spacing between the second lens element and the third lens element is T23, and they satisfy the relation:

0.7<Td/ImgH<2.0; 0.8<SL/TTL<1.2; and 0.1<T12/T23<1.0.

When the relation of 0.7<Td/ImgH<2.0 is satisfied, the total optical track length can be favorably reduced for keeping the system compact. When the relation of 0.8<SL/TTL<1.2 is satisfied, the position of the aperture stop can obtain a best balance between the telecentricity and the wide field of view; preferably, the following relation is satisfied:

0.84<SL/TTL<0.97.

When the relation of 0.1<T12/T23<1.0 is satisfied, the arrangement of the first, second and third lens elements is more suitable for lens assembly.

In the aforementioned optical photographing system, a focal length of the optical photographing system is f, a focal length of the second lens element is f2, and they preferably satisfy the relation:

1.0<f/f2<2.5.

When the above relation is satisfied, the refractive power of the second lens element is more proper and thereby the total optical track length of the system can be reduced effectively.

In the aforementioned optical photographing system, a focal length of the optical photographing system is f, a focal length of the first lens element is f1, and they preferably satisfy the relation:

0<f/f1<0.5.

When the above relation is satisfied, the arrangement of the refractive power of the first lens element is more in balance so that the total optical track length of the system can be effectively controlled for keeping the system compact, and the high order spherical aberration can be prevented at the same time for improving image resolution.

In the aforementioned optical photographing system, a radius of curvature of the image-side surface of the second lens element is R4, a radius of curvature of the object-side surface of the second lens element is R3, and they preferably satisfy the relation:

0.0<|R4/R3|<0.8.

When the above relation is satisfied, the curvature of the second lens element is not bent excessively, which is good to offer proper correction for the astigmatism of the system.

In the aforementioned optical photographing system, a thickness of the first lens element on the optical axis is CT1, a thickness of the second lens element on the optical axis is CT2, and they preferably satisfy the relation:

0.2<CT1/CT2<0.5.

When the above relation is satisfied, the thickness of the first lens element and the second lens element is more proper, which is favorable for lens manufacture and assembly.

In the aforementioned optical photographing system, the lens elements can be made of glass or plastic material. If the lens elements are made of glass, there is more freedom in distributing the refractive power of the optical system. If plastic material is adopted to produce the lens elements, the production cost will be reduced effectively. Additionally, the surfaces of the lens elements can be aspheric and easily made into non-spherical profiles, allowing more design parameter freedom which can be used to reduce the aberration and decrease the number of the lens elements. Consequently, the total track length of the optical photographing system can be effectively reduced.

In the present optical photographing system, if a lens element has a convex surface, it means the portion of the surface in proximity to the optical axis is convex; if a lens element has a concave surface, it means the portion of the surface in proximity to the optical axis is concave.

Preferred embodiments of the present invention will be described in the following paragraphs by referring to the accompanying drawings.

Embodiment 1

Figure 1B:
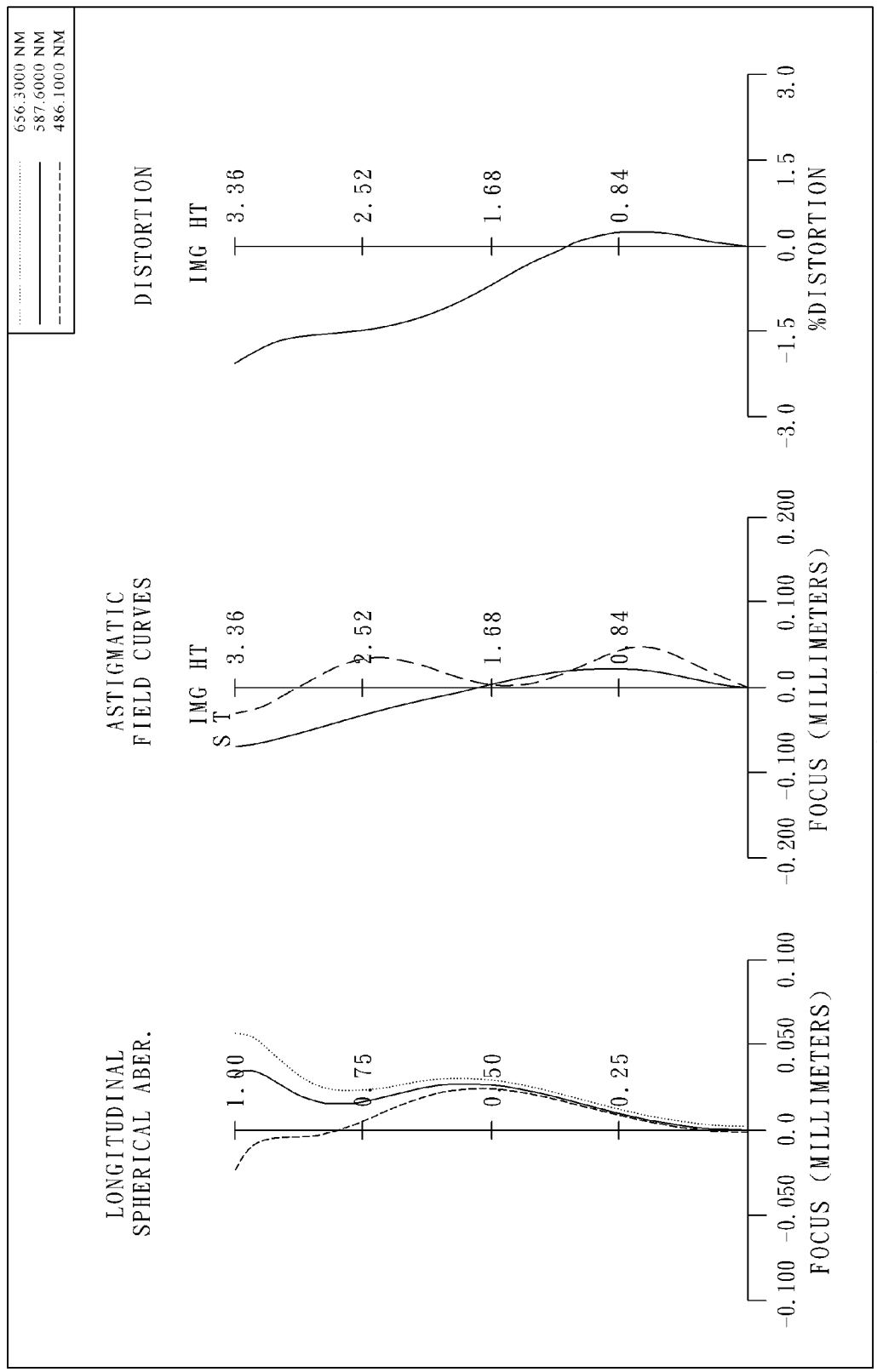
FIG. 1B shows the aberration curves of the first embodiment of the present invention.

FIG. 1A shows an optical photographing system in accordance with a first embodiment of the present invention, and FIG. 1B shows the aberration curves of the first embodiment of the present invention. The optical photographing system of the first embodiment of the present invention mainly comprises four lens elements, in order from an object side to an image side:

a plastic first lens element 110 with negative refractive power having a convex object-side surface 111 and a concave image-side surface 112, the object-side and image-side surfaces 111 and 112 thereof being aspheric, and at least one inflection point is formed on both the object-side and image-side surfaces 111 and 112 thereof;

a plastic second lens element 120 with positive refractive power having a convex object-side surface 121 and a convex image-side surface 122, the object-side and image-side surfaces 121 and 122 thereof being aspheric;

a plastic third lens element 130 with negative refractive power having a concave object-side surface 131 and a convex image-side surface 132, the object-side and image-side surfaces 131 and 132 thereof being aspheric, and at least one inflection point is formed on both the object-side and image-side surfaces 131 and 132 thereof; and a plastic fourth lens element 140 with positive refractive power having a convex object-side surface 141 and a concave image-side surface 142, the object-side and image-side surfaces 141 and 142 thereof being aspheric, and at least one inflection point is form on both the object-side and image-side surfaces 141 and 142 thereof;

wherein an aperture stop 100 is disposed between the imaged object and the second lens element 120;

the optical photographing system further comprises an IR filter 150 disposed between the image-side surface 142 of the fourth lens element 140 and an image plane 170; a cover-glass 160 disposed between the IR filter 150 and the image plane 170; and an electronic sensor is further provided on the image plane 170; the IR filter 150 is made of glass and has no influence on the focal length of the optical photographing system.

The equation of the aspheric surface profiles is expressed as follows:

$$X(Y) = (Y^2/R)/(1 + \operatorname{sqrt}(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical photographing system, the focal length of the optical photographing system is f, and it satisfies the relation:

$$f=4.54 \text{ (mm)}.$$

In the first embodiment of the present optical photographing system, the f-number of the optical photographing system is Fno, and it satisfies the relation:

$$Fno=2.07.$$

In the first embodiment of the present optical photographing system, half of the maximal field of view of the optical photographing system is HFOV, and it satisfies the relation:

$$HFOV=37.1 \text{ deg}.$$

In the first embodiment of the present optical photographing system, the Abbe number of the fourth lens element 140 is V4, the Abbe number of the third lens element 130 is V3, and they satisfy the relation:

$$V4-V3=32.5.$$

In the first embodiment of the present optical photographing system, the on-axis spacing between the first lens element 110 and the second lens element 120 is T12, the on-axis spacing between the third lens element 130 and the fourth lens element 140 is T34, the on-axis spacing between the second lens element 120 and the third lens element 130 is T23, and they satisfy the relation:

$$(T12+T34)/T23=0.35.$$

In the first embodiment of the present optical photographing system, the on-axis spacing between the first lens element 110 and the second lens element 120 is T12, the on-axis spacing between the second lens element 120 and the third lens element 130 is T23, and they satisfy the relation:

$$T12/T23=0.28.$$

In the first embodiment of the present optical photographing system, the thickness of the first lens element 110 on the optical axis is CT1, a thickness of the second lens element 120 on the optical axis is CT2, and they satisfy the relation:

$$CT1/CT2=0.22.$$

In the first embodiment of the present optical photographing system, the radius of curvature of the image-side surface 122 of the second lens element 120 is R4, a radius of curvature of the object-side surface 121 of the second lens element 120 is R3, and they satisfy the relation:

$$|R4/R3|=0.54.$$

In the first embodiment of the present optical photographing system, the radius of curvature of the object-side surface 131 of the third lens element 130 is R5, the radius of curvature of the image-side surface 132 of the third lens element 130 is R6, and they satisfy the relation:

$$(R5+R6)/(R5-R6)=-3.17.$$

In the first embodiment of the present optical photographing system, the focal length of the optical photographing system is f, the focal length of the first lens element 110 is f1, and they satisfy the relation:

$$f/f1=-0.33.$$

In the first embodiment of the present optical photographing system, the focal length of the optical photographing system is f, the focal length of the second lens element 120 is f2, and they satisfy the relation:

$$f/f2=1.55.$$

In the first embodiment of the present optical photographing system, the focal length of the optical photographing system is f, the focal length of the third lens element 130 is f3, and they satisfy the relation:

$$f/f3=-1.32.$$

In the first embodiment of the present optical photographing system, the distance on the optical axis between the aperture stop 100 and the electronic sensor is SL, the distance on the optical axis between the object-side surface 111 of the first lens element 100 and the electronic sensor is TTL, and they satisfy the relation:

$$SL/TTL=0.93.$$

In the first embodiment of the present optical photographing system, the distance on the optical axis between the object-side surface 111 of the first lens element 110 and the image-side surface 142 of the fourth lens element 140 is Td, half of the diagonal length of the effective pixel area of the electronic sensor is ImgH, and they preferably satisfy the relation:

$$Td/ImgH=1.55.$$

The detailed optical data of the first embodiment is shown in FIG. 8 (TABLE 1), and the aspheric surface data is shown in FIG. 9 (TABLE 2), wherein the units of the radius of curvature, the thickness and the focal length are expressed in mm, and HFOV is half of the maximal field of view.

Embodiment 2

Figure 2A:
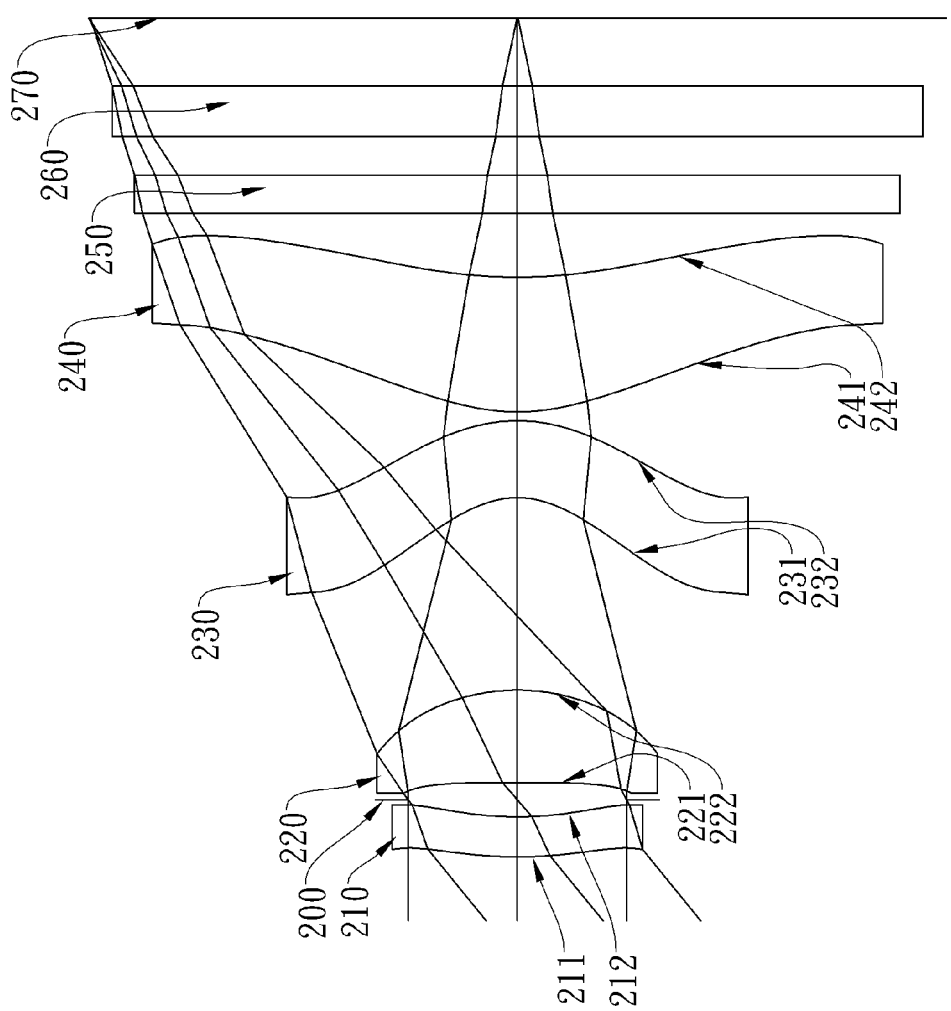
FIG. 2A shows an optical photographing system in accordance with a second embodiment of the present invention.
Figure 2B:
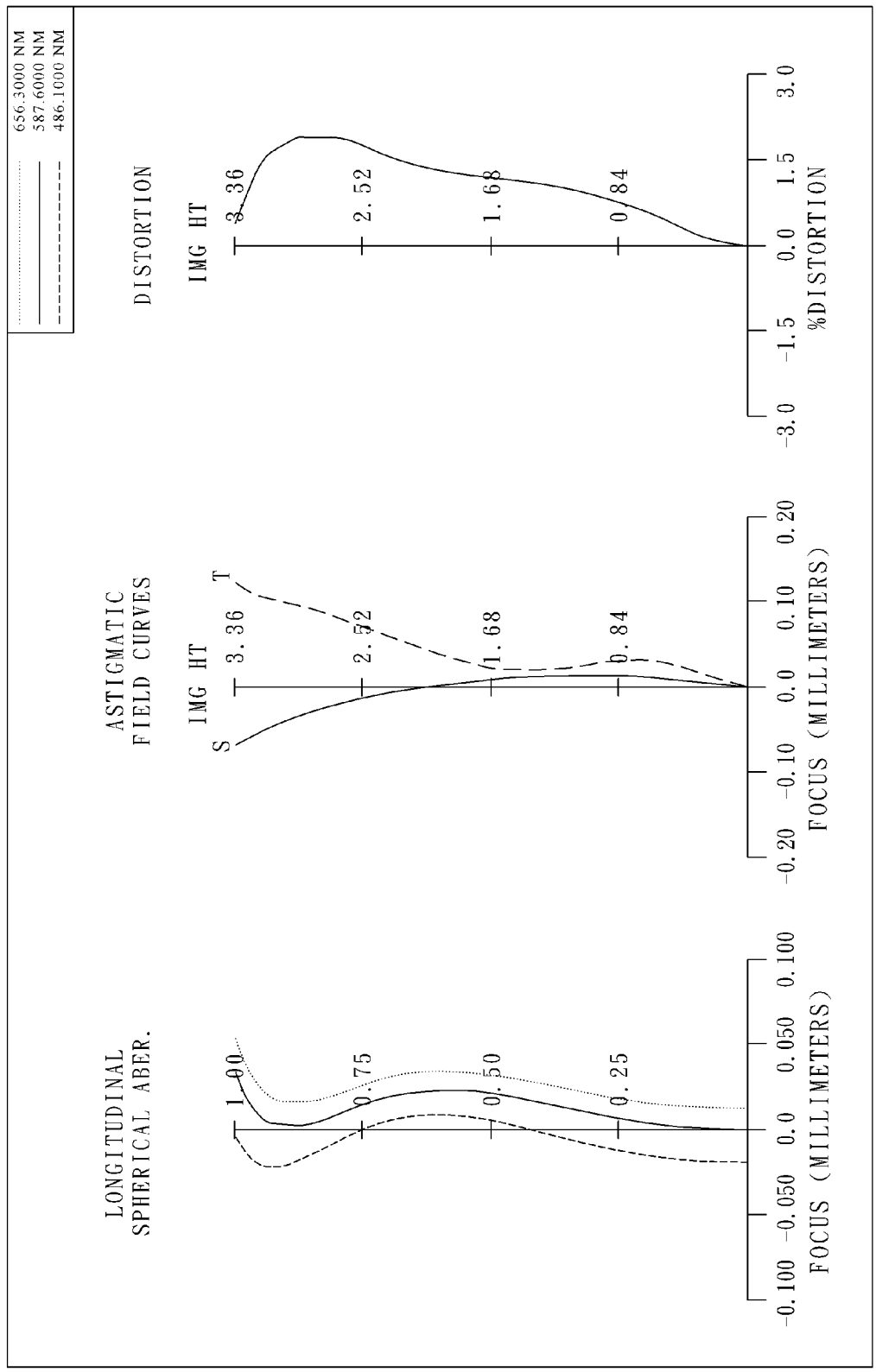
FIG. 2B shows the aberration curves of the second embodiment of the present invention.

FIG. 2A shows an optical photographing system in accordance with a second embodiment of the present invention, and FIG. 2B shows the aberration curves of the second embodiment of the present invention. The optical photographing system of the second embodiment of the present invention mainly comprises four lens elements, in order from an object side to an image side:

a plastic first lens element 210 with negative refractive power having a convex object-side surface 211 and a concave image-side surface 212, the object-side and image-side surfaces 211 and 212 thereof being aspheric, and at least one inflection point is formed on both the object-side and image-side surfaces 211 and 212 thereof;

a plastic second lens element 220 with positive refractive power having a concave object-side surface 221 and a convex image-side surface 222, the object-side and image-side surfaces 221 and 222 thereof being aspheric;

a plastic third lens element 230 with negative refractive power having a concave object-side surface 231 and a convex image-side surface 232, the object-side and image-side surfaces 231 and 232 thereof being aspheric, and at least one inflection point is formed on both the object-side and image-side surfaces 231 and 232 thereof; and a plastic fourth lens element 240 with positive refractive power having a convex object-side surface 241 and a concave image-side surface 242, the object-side and image-side surfaces 241 and 242 thereof being aspheric, and at least one inflection point is form on both the object-side and image-side surfaces 241 and 242 thereof;

wherein an aperture stop 200 is disposed between the imaged object and the second lens element 220;

the optical photographing system further comprises an IR filter 250 disposed between the image-side surface 242 of the fourth lens element 240 and an image plane 270; a cover-glass 260 disposed between the IR filter 250 and the image plane 270; and an electronic sensor is further provided on the image plane 270; the IR filter 250 is made of glass and has no influence on the focal length of the optical photographing system.

The equation of the aspheric surface profiles of the second embodiment has the same form as that of the first embodiment.

In the second embodiment of the present optical photographing system, the focal length of the optical photographing system is f, and it satisfies the relation:

$f=4.11$ (mm).

In the second embodiment of the present optical photographing system, the f-number of the optical photographing system is Fno, and it satisfies the relation:

$Fno=2.40$.

In the second embodiment of the present optical photographing system, half of the maximal field of view of the optical photographing system is HFOV, and it satisfies the relation:

$HFOV=39.1$ deg.

In the second embodiment of the present optical photographing system, the Abbe number of the fourth lens element 240 is V4, the Abbe number of the third lens element 230 is V3, and they satisfy the relation:

$V4-V3=34.5$.

In the second embodiment of the present optical photographing system, the on-axis spacing between the first lens element 210 and the second lens element 220 is T12, the on-axis spacing between the third lens element 230 and the fourth lens element 240 is T34, the on-axis spacing between the second lens element 220 and the third lens element 230 is T23, and they satisfy the relation:

$(T12+T34)/T23=0.22$.

In the second embodiment of the present optical photographing system, the on-axis spacing between the first lens element 210 and the second lens element 220 is T12, the on-axis spacing between the second lens element 220 and the third lens element 230 is T23, and they satisfy the relation:

$T12/T23=0.18$.

In the second embodiment of the present optical photographing system, the thickness of the first lens element 210 on the optical axis is CT1, a thickness of the second lens element 220 on the optical axis is CT2, and they satisfy the relation:

$CT1/CT2=0.43$.

In the second embodiment of the present optical photographing system, the radius of curvature of the image-side surface 222 of the second lens element 220 is R4, a radius of curvature of the object-side surface 221 of the second lens element 220 is R3, and they satisfy the relation:

$|R4/R3|=0.05$.

In the second embodiment of the present optical photographing system, the radius of curvature of the object-side surface 231 of the third lens element 230 is R5, the radius of curvature of the image-side surface 232 of the third lens element 230 is R6, and they satisfy the relation:

$(R5-R6)/(R5-R6)=-3.37$.

In the second embodiment of the present optical photographing system, the focal length of the optical photographing system is f, the focal length of the first lens element 210 is f1, and they satisfy the relation:

$f/f1=-0.12$.

In the second embodiment of the present optical photographing system, the focal length of the optical photographing system is f, the focal length of the second lens element 220 is f2, and they satisfy the relation:

$f/f2=1.32$.

In the second embodiment of the present optical photographing system, the focal length of the optical photographing system is f, the focal length of the third lens element 230 is f3, and they satisfy the relation:

$f/f3=-1.06$.

In the second embodiment of the present optical photographing system, the distance on the optical axis between the aperture stop 200 and the electronic sensor is SL, the distance on the optical axis between the object-side surface 211 of the first lens element 200 and the electronic sensor is TTL, and they satisfy the relation:

$SL/TTL=0.93$.

In the second embodiment of the present optical photographing system, the distance on the optical axis between the object-side surface 211 of the first lens element 210 and the image-side surface 242 of the fourth lens element 240 is Td, half of the diagonal length of the effective pixel area of the electronic sensor is ImgH, and they preferably satisfy the relation:

$Td/ImgH=1.35$.

The detailed optical data of the second embodiment is shown in FIG. 10 (TABLE 3), and the aspheric surface data is shown in FIG. 11 (TABLE 4), wherein the units of the radius of curvature, the thickness and the focal length are expressed in mm, and HFOV is half of the maximal field of view.

Embodiment 3

Figure 3A:
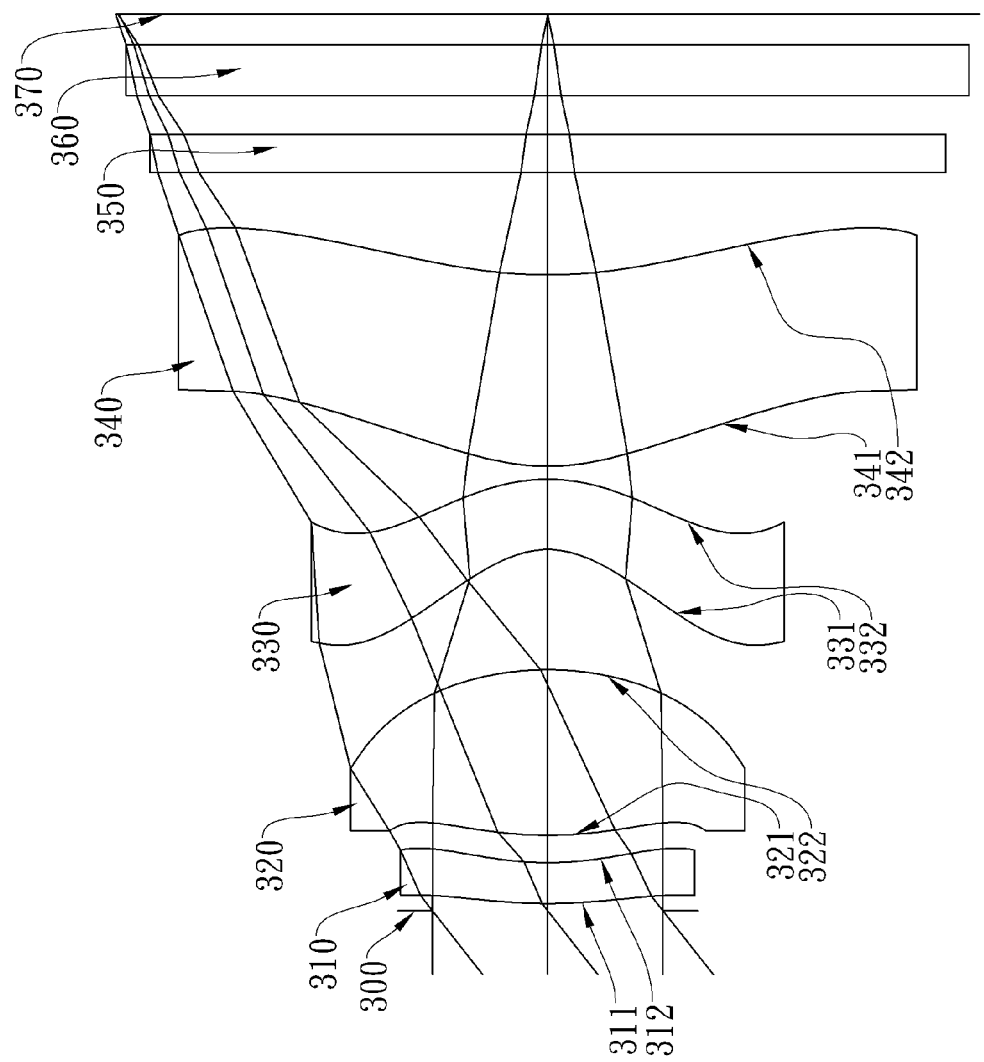
FIG. 3A shows an optical photographing system in accordance with a third embodiment of the present invention.
Figure 3B:
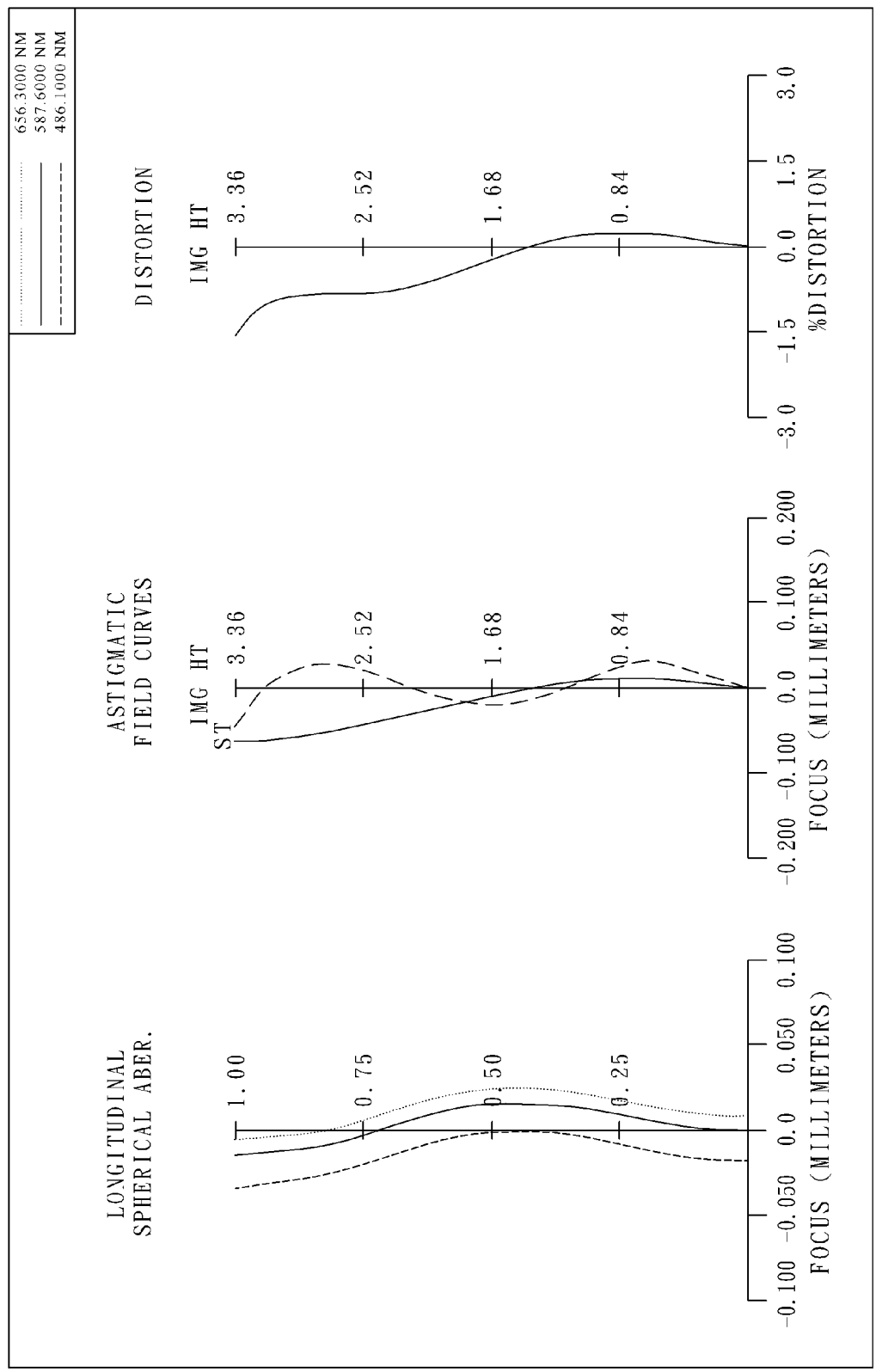
FIG. 3B shows the aberration curves of the third embodiment of the present invention.

FIG. 3A shows an optical photographing system in accordance with a third embodiment of the present invention, and FIG. 3B shows the aberration curves of the third embodiment of the present invention. The optical photographing system of the third embodiment of the present invention mainly comprises four lens elements, in order from an object side to an image side:

a plastic first lens element 310 with negative refractive power having a convex object-side surface 311 and a concave image-side surface 312, the object-side and image-side surfaces 311 and 312 thereof being aspheric, and at least one inflection point is formed on both the object-side and image-side surfaces 311 and 312 thereof;

a plastic second lens element 320 with positive refractive power having a convex object-side surface 321 and a convex image-side surface 322, the object-side and image-side surfaces 321 and 322 thereof being aspheric;

a plastic third lens element 330 with negative refractive power having a concave object-side surface 331 and a convex image-side surface 332, the object-side and image-side surfaces 331 and 332 thereof being aspheric, and at least one inflection point is formed on both the object-side and image-side surfaces 331 and 332 thereof; and a plastic fourth lens element 340 with positive refractive power having a convex object-side surface 341 and a concave image-side surface 342, the object-side and image-side surfaces 341 and 342 thereof being aspheric, and at least one inflection point is form on image-side surface 342 thereof;

wherein an aperture stop 300 is disposed between the imaged object and the second lens element 320;

the optical photographing system further comprises an IR filter 350 disposed between the image-side surface 342 of the fourth lens element 340 and an image plane 370; a cover-glass 360 disposed between the IR filter 350 and the image plane 370; and an electronic sensor is further provided on the image plane 370; the IR filter 350 is made of glass and has no influence on the focal length of the optical photographing system.

The equation of the aspheric surface profiles of the third embodiment has the same form as that of the first embodiment.

In the third embodiment of the present optical photographing system, the focal length of the optical photographing system is f, and it satisfies the relation:

$f$=4.34 (mm).

In the third embodiment of the present optical photographing system, the f-number of the optical photographing system is Fno, and it satisfies the relation:

$Fno$=2.40.

In the third embodiment of the present optical photographing system, half of the maximal field of view of the optical photographing system is HFOV, and it satisfies the relation:

$HFOV$=38.2 deg.

In the third embodiment of the present optical photographing system, the Abbe number of the fourth lens element 340 is V4, the Abbe number of the third lens element 330 is V3, and they satisfy the relation:

$V4-V3$=32.5.

In the third embodiment of the present optical photographing system, the on-axis spacing between the first lens element 310 and the second lens element 320 is T12, the on-axis spacing between the third lens element 330 and the fourth lens element 340 is T34, the on-axis spacing between the second lens element 320 and the third lens element 330 is T23, and they satisfy the relation:

$(T12+T34)/T23$=0.34.

In the third embodiment of the present optical photographing system, the on-axis spacing between the first lens element 310 and the second lens element 320 is T12, the on-axis spacing between the second lens element 320 and the third lens element 330 is T23, and they satisfy the relation:

$T12/T23$=0.23.

In the third embodiment of the present optical photographing system, the thickness of the first lens element 310 on the optical axis is CT1, a thickness of the second lens element 320 on the optical axis is CT2, and they satisfy the relation:

$CT1/CT2$=0.25.

In the third embodiment of the present optical photographing system, the radius of curvature of the image-side surface 322 of the second lens element 320 is R4, a radius of curvature of the object-side surface 321 of the second lens element 320 is R3, and they satisfy the relation:

$|R4/R3|$=0.78.

In the third embodiment of the present optical photographing system, the radius of curvature of the object-side surface 331 of the third lens element 330 is R5, the radius of curvature of the image-side surface 332 of the third lens element 330 is R6, and they satisfy the relation:

$(R5+R6)/(R5-R6)$=−3.03.

In the third embodiment of the present optical photographing system, the focal length of the optical photographing system is f, the focal length of the first lens element 310 is f1, and they satisfy the relation:

$f/f1$=−0.35.

In the third embodiment of the present optical photographing system, the focal length of the optical photographing system is f, the focal length of the second lens element 320 is f2, and they satisfy the relation:

$f/f2$=1.63.

In the third embodiment of the present optical photographing system, the focal length of the optical photographing system is f, the focal length of the third lens element 330 is f3, and they satisfy the relation:

$f/f3$=−1.36.

In the third embodiment of the present optical photographing system, the distance on the optical axis between the aperture stop 300 and the electronic sensor is SL, the distance on the optical axis between the object-side surface 311 of the first lens element 300 and the electronic sensor is TTL, and they satisfy the relation:

$SL/TTL$=1.01.

In the third embodiment of the present optical photographing system, the distance on the optical axis between the object-side surface 311 of the first lens element 310 and the image-side surface 342 of the fourth lens element 340 is Td, half of the diagonal length of the effective pixel area of the electronic sensor is ImgH, and they preferably satisfy the relation:

$Td/ImgH$=1.47.

The detailed optical data of the third embodiment is shown in FIG. 12 (TABLE 5), and the aspheric surface data is shown in FIG. 13 (TABLE 6), wherein the units of the radius of curvature, the thickness and the focal length are expressed in mm, and HFOV is half of the maximal field of view.

Embodiment 4

Figure 4A:
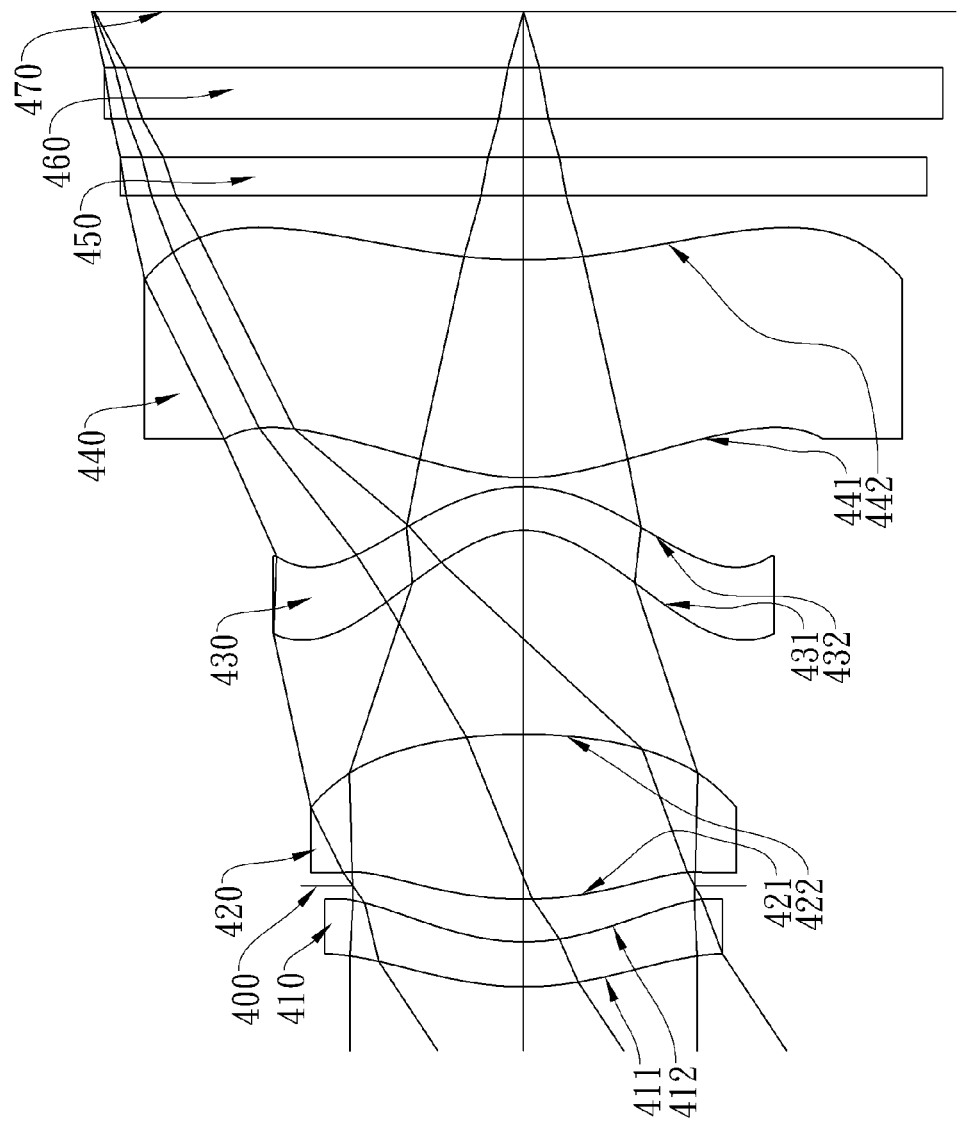
FIG. 4A shows an optical photographing system in accordance with a fourth embodiment of the present invention.
Figure 4B:
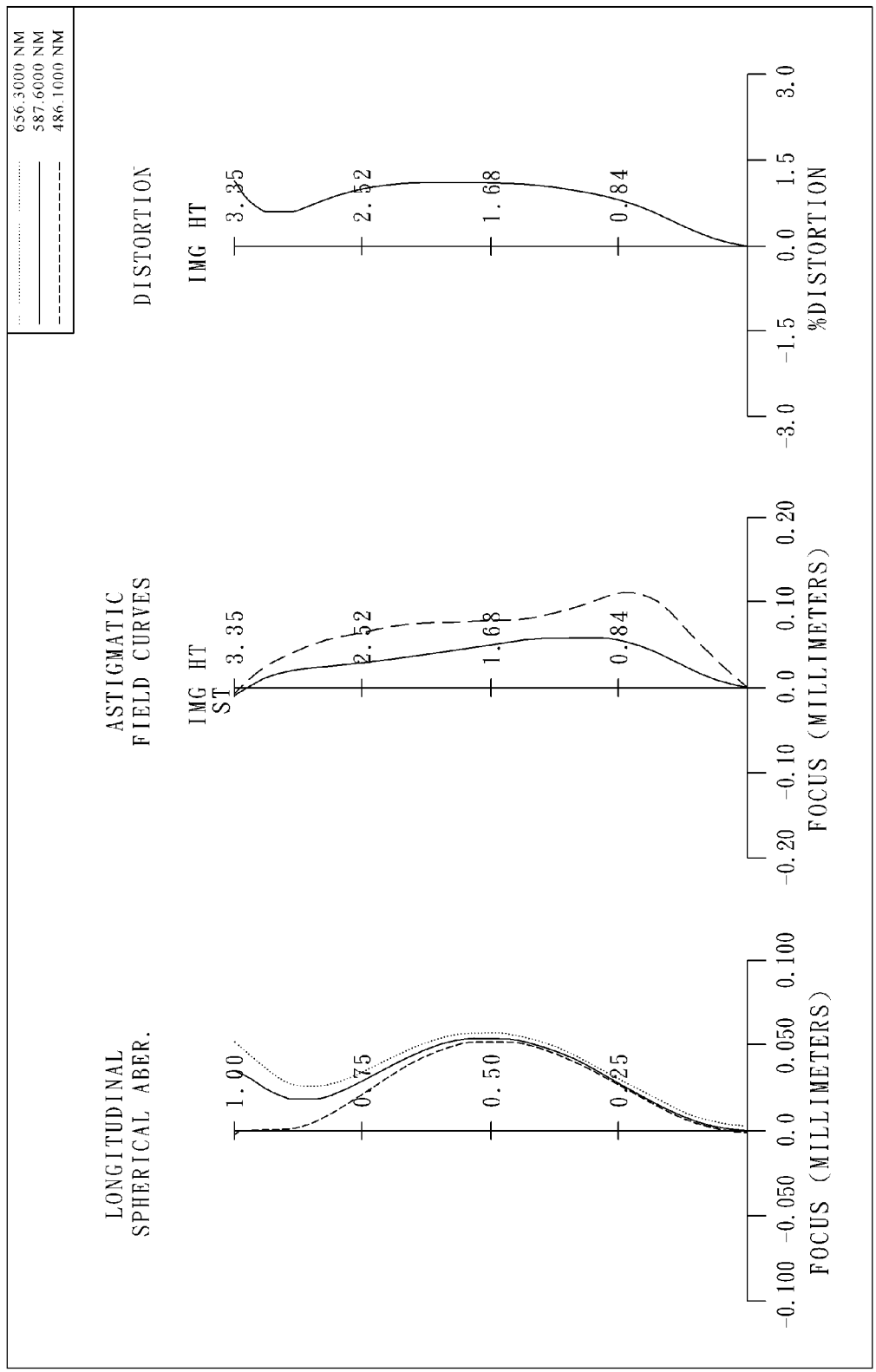
FIG. 4B shows the aberration curves of the fourth embodiment of the present invention.

FIG. 4A shows an optical photographing system in accordance with a fourth embodiment of the present invention, and FIG. 4B shows the aberration curves of the fourth embodiment of the present invention. The optical photographing system of the fourth embodiment of the present invention mainly comprises four lens elements, in order from an object side to an image side:

a plastic first lens element 410 with negative refractive power having a convex object-side surface 411 and a concave image-side surface 412, the object-side and image-side surfaces 411 and 412 thereof being aspheric, and at least one inflection point is formed on both the object-side and image-side surfaces 411 and 412 thereof;

a plastic second lens element 420 with positive refractive power having a convex object-side surface 421 and a convex image-side surface 422, the object-side and image-side surfaces 421 and 422 thereof being aspheric;

a plastic third lens element 430 with negative refractive power having a concave object-side surface 431 and a convex image-side surface 432, the object-side and image-side surfaces 431 and 432 thereof being aspheric, and at least one inflection point is formed on both the object-side and image-side surfaces 431 and 432 thereof; and a plastic fourth lens element 440 with positive refractive power having a convex object-side surface 441 and a concave image-side surface 142, the object-side and image-side surfaces 441 and 442 thereof being aspheric, and at least one inflection point is form on both the object-side and image-side surfaces 441 and 442 thereof;

wherein an aperture stop 400 is disposed between the imaged object and the second lens element 420;

the optical photographing system further comprises an IR filter 450 disposed between the image-side surface 442 of the fourth lens element 440 and an image plane 470; a cover-glass 460 disposed between the IR filter 450 and the image plane 470; and an electronic sensor is further provided on the image plane 470; the IR filter 450 is made of glass and has no influence on the focal length of the optical photographing system.

The equation of the aspheric surface profiles of the fourth embodiment has the same form as that of the first embodiment.

In the fourth embodiment of the present optical photographing system, the focal length of the optical photographing system is f, and it satisfies the relation:

$f=5.06$ (mm).

In the fourth embodiment of the present optical photographing system, the f-number of the optical photographing system is Fno, and it satisfies the relation:

$Fno=1.85$.

In the fourth embodiment of the present optical photographing system, half of the maximal field of view of the optical photographing system is HFOV, and it satisfies the relation:

$HFOV=33.4$ deg.

In the fourth embodiment of the present optical photographing system, the Abbe number of the fourth lens element 440 is V4, the Abbe number of the third lens element 430 is V3, and they satisfy the relation:

$V4-V3=33.0$.

In the fourth embodiment of the present optical photographing system, the on-axis spacing between the first lens element 410 and the second lens element 420 is T12, the on-axis spacing between the third lens element 430 and the fourth lens element 440 is T34, the on-axis spacing between the second lens element 420 and the third lens element 430 is T23, and they satisfy the relation:

$(T12+T34)/T23=0.25$.

In the fourth embodiment of the present optical photographing system, the on-axis spacing between the first lens element 410 and the second lens element 420 is T12, the on-axis spacing between the second lens element 420 and the third lens element 430 is T23, and they satisfy the relation:

$T12/T23=0.21$.

In the fourth embodiment of the present optical photographing system, the thickness of the first lens element 410 on the optical axis is CT1, a thickness of the second lens element 420 on the optical axis is CT2, and they satisfy the relation:

$CT1/CT2=0.27$.

In the fourth embodiment of the present optical photographing system, the radius of curvature of the image-side surface 422 of the second lens element 420 is R4, a radius of curvature of the object-side surface 421 of the second lens element 420 is R3, and they satisfy the relation:

$|R4/R3|=1.53$.

In the fourth embodiment of the present optical photographing system, the radius of curvature of the object-side surface 431 of the third lens element 430 is R5, the radius of curvature of the image-side surface 432 of the third lens element 430 is R6, and they satisfy the relation:

$(R5+R6)/(R5-R6)=-4.15$.

In the fourth embodiment of the present optical photographing system, the focal length of the optical photographing system is f, the focal length of the first lens element 410 is f1, and they satisfy the relation:

$f/f1=-0.42$.

In the fourth embodiment of the present optical photographing system, the focal length of the optical photographing system is f, the focal length of the second lens element 420 is f2, and they satisfy the relation:

$f/f2=1.48$.

In the fourth embodiment of the present optical photographing system, the focal length of the optical photographing system is f, the focal length of the third lens element 430 is f3, and they satisfy the relation:

$f/f3=-1.26$.

In the fourth embodiment of the present optical photographing system, the distance on the optical axis between the aperture stop 400 and the electronic sensor is SL, the distance on the optical axis between the object-side surface 411 of the first lens element 400 and the electronic sensor is TTL, and they satisfy the relation:

$SL/TTL=0.89$.

In the fourth embodiment of the present optical photographing system, the distance on the optical axis between the object-side surface 411 of the first lens element 410 and the image-side surface 442 of the fourth lens element 440 is Td, half of the diagonal length of the effective pixel area of the electronic sensor is ImgH, and they preferably satisfy the relation:

$Td/ImgH=1.69$.

The detailed optical data of the fourth embodiment is shown in FIG. 14 (TABLE 7), and the aspheric surface data is shown in FIG. 15 (TABLE 8), wherein the units of the radius of curvature, the thickness and the focal length are expressed in mm, and HFOV is half of the maximal field of view.

Embodiment 5

Figure 5A:
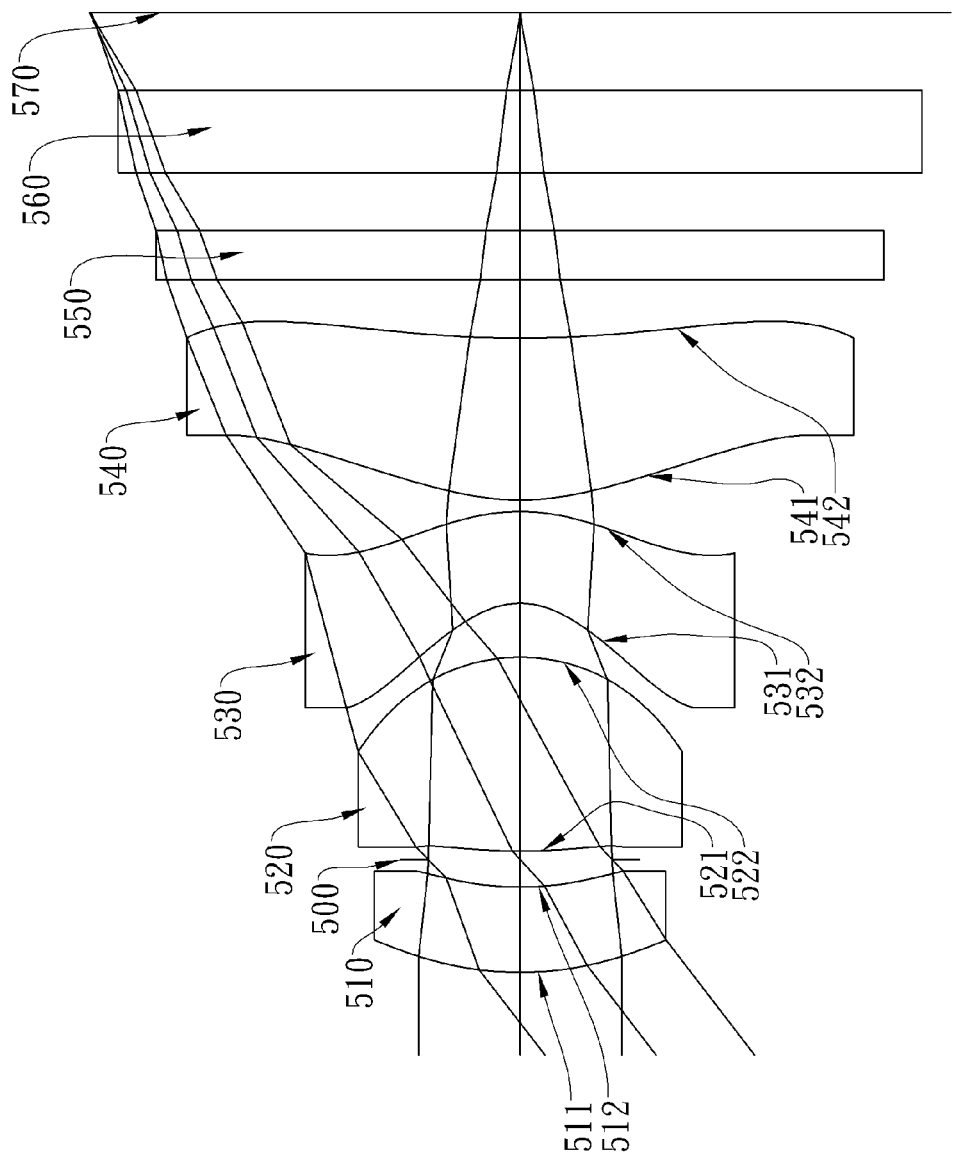
FIG. 5A shows an optical photographing system in accordance with a fifth embodiment of the present invention.
Figure 5B:
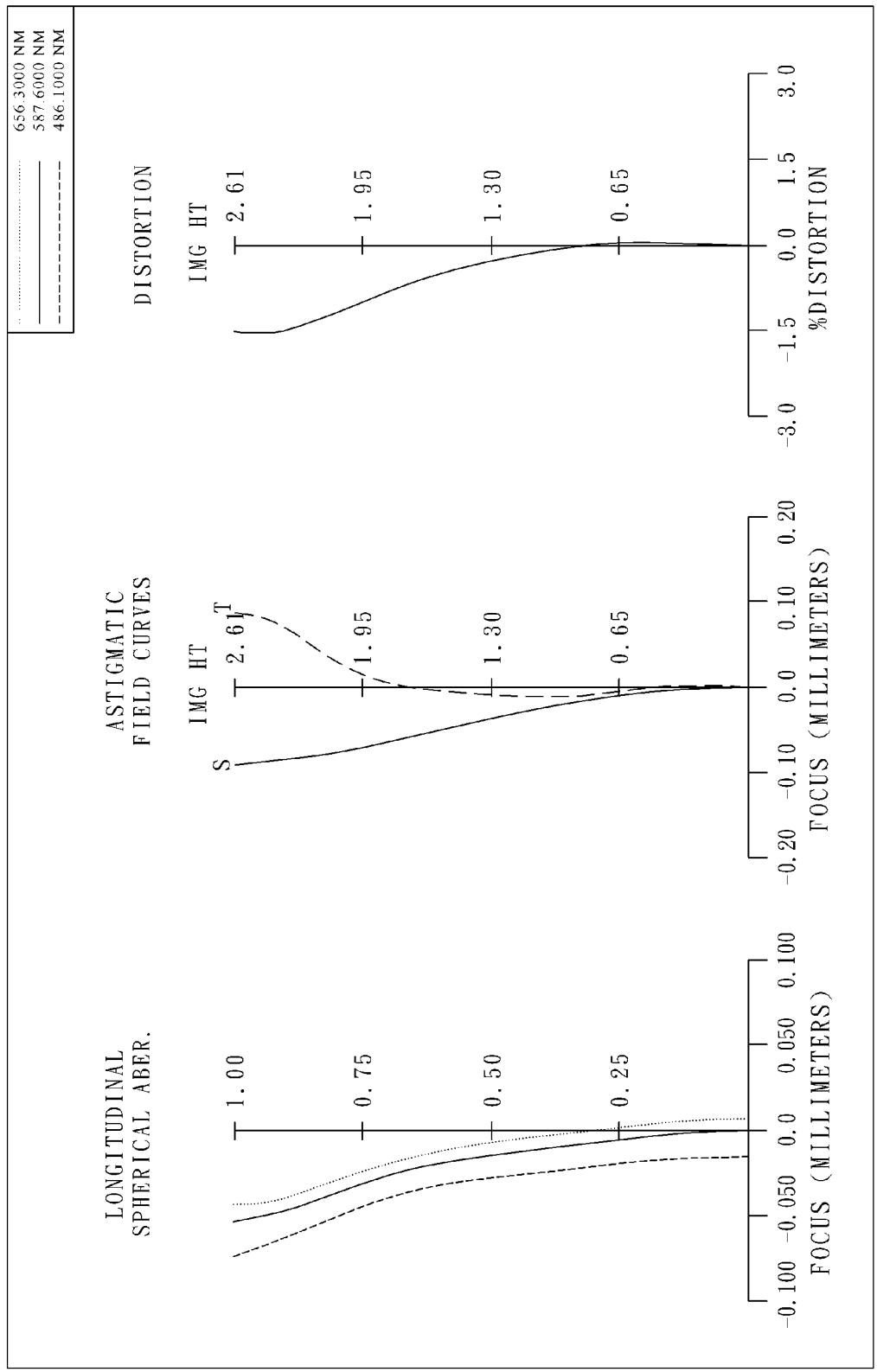
FIG. 5B shows the aberration curves of the fifth embodiment of the present invention.

FIG. 5A shows an optical photographing system in accordance with a fifth embodiment of the present invention, and FIG. 5B shows the aberration curves of the fifth embodiment of the present invention. The optical photographing system of the fifth embodiment of the present invention mainly comprises four lens elements, in order from an object side to an image side:

a plastic first lens element 510 with negative refractive power having a convex object-side surface 511 and a concave image-side surface 512, and the object-side and image-side surfaces 511 and 512 thereof being aspheric;

a plastic second lens element 520 with positive refractive power having a convex object-side surface 521 and a convex image-side surface 522, the object-side and image-side surfaces 521 and 522 thereof being aspheric;

a plastic third lens element 530 with negative refractive power having a concave object-side surface 531 and a convex image-side surface 532, the object-side and image-side surfaces 531 and 532 thereof being aspheric, and at least one inflection point is formed on both the object-side and image-side surfaces 531 and 532 thereof; and a plastic fourth lens element 540 with positive refractive power having a convex object-side surface 541 and a concave image-side surface 542, the object-side and image-side surfaces 541 and 542 thereof being aspheric, and at least one inflection point is form on both the object-side and image-side surfaces 541 and 542 thereof;

wherein an aperture stop 500 is disposed between the imaged object and the second lens element 520;

the optical photographing system further comprises an IR filter 550 disposed between the image-side surface 542 of the fourth lens element 540 and an image plane 570; a cover-glass 560 disposed between the IR filter 550 and the image plane 570; and an electronic sensor is further provided on the image plane 570; the IR filter 550 is made of glass and has no influence on the focal length of the optical photographing system.

The equation of the aspheric surface profiles of the fifth embodiment has the same form as that of the first embodiment.

In the fifth embodiment of the present optical photographing system, the focal length of the optical photographing system is f, and it satisfies the relation:

$f=3.44$ (mm).

In the fifth embodiment of the present optical photographing system, the f-number of the optical photographing system is Fno, and it satisfies the relation:

$Fno=2.81$.

In the fifth embodiment of the present optical photographing system, half of the maximal field of view of the optical photographing system is HFOV, and it satisfies the relation:

$HFOV=37.6$ deg.

In the fifth embodiment of the present optical photographing system, the Abbe number of the fourth lens element 540 is V4, the Abbe number of the third lens element 530 is V3, and they satisfy the relation:

$V4-V3=25.6$.

In the fifth embodiment of the present optical photographing system, the on-axis spacing between the first lens element 510 and the second lens element 520 is T12, the on-axis spacing between the third lens element 530 and the fourth lens element 540 is T34, the on-axis spacing between the second lens element 520 and the third lens element 530 is T23, and they satisfy the relation:

$(T12+T34)/T23=0.88$.

In the fifth embodiment of the present optical photographing system, the on-axis spacing between the first lens element 510 and the second lens element 520 is T12, the on-axis spacing between the second lens element 520 and the third lens element 530 is T23, and they satisfy the relation:

$T12/T23=0.67$.

In the fifth embodiment of the present optical photographing system, the thickness of the first lens element 510 on the optical axis is CT1, a thickness of the second lens element 520 on the optical axis is CT2, and they satisfy the relation:

$CT1/CT2=0.44$.

In the fifth embodiment of the present optical photographing system, the radius of curvature of the image-side surface 522 of the second lens element 520 is R4, a radius of curvature of the object-side surface 521 of the second lens element 520 is R3, and they satisfy the relation:

$|R4/R3|=0.37$.

In the fifth embodiment of the present optical photographing system, the radius of curvature of the object-side surface 531 of the third lens element 530 is R5, the radius of curvature of the image-side surface 532 of the third lens element 530 is R6, and they satisfy the relation:

$(R5+R6)/(R5-R6)=-2.26$.

In the fifth embodiment of the present optical photographing system, the focal length of the optical photographing system is f, the focal length of the first lens element 510 is f1, and they satisfy the relation:

$f/f1=-0.02$.

In the fifth embodiment of the present optical photographing system, the focal length of the optical photographing system is f, the focal length of the second lens element 520 is f2, and they satisfy the relation:

$f/f2=1.97$.

In the fifth embodiment of the present optical photographing system, the focal length of the optical photographing system is f, the focal length of the third lens element 530 is f3, and they satisfy the relation:

$f/f3=-1.91$.

In the fifth embodiment of the present optical photographing system, the distance on the optical axis between the aperture stop 500 and the electronic sensor is SL, the distance on the optical axis between the object-side surface 511 of the first lens element 500 and the electronic sensor is TTL, and they satisfy the relation:

$SL/TTL=0.88$.

In the fifth embodiment of the present optical photographing system, the distance on the optical axis between the object-side surface 511 of the first lens element 510 and the image-side surface 542 of the fourth lens element 540 is Td, half of the diagonal length of the effective pixel area of the electronic sensor is ImgH, and they preferably satisfy the relation:

$Td/ImgH=1.47$.

The detailed optical data of the fifth embodiment is shown in FIG. 16 (TABLE 9), and the aspheric surface data is shown in FIG. 17 (TABLE 10), wherein the units of the radius of curvature, the thickness and the focal length are expressed in mm, and HFOV is half of the maximal field of view.

Embodiment 6

Figure 6A:
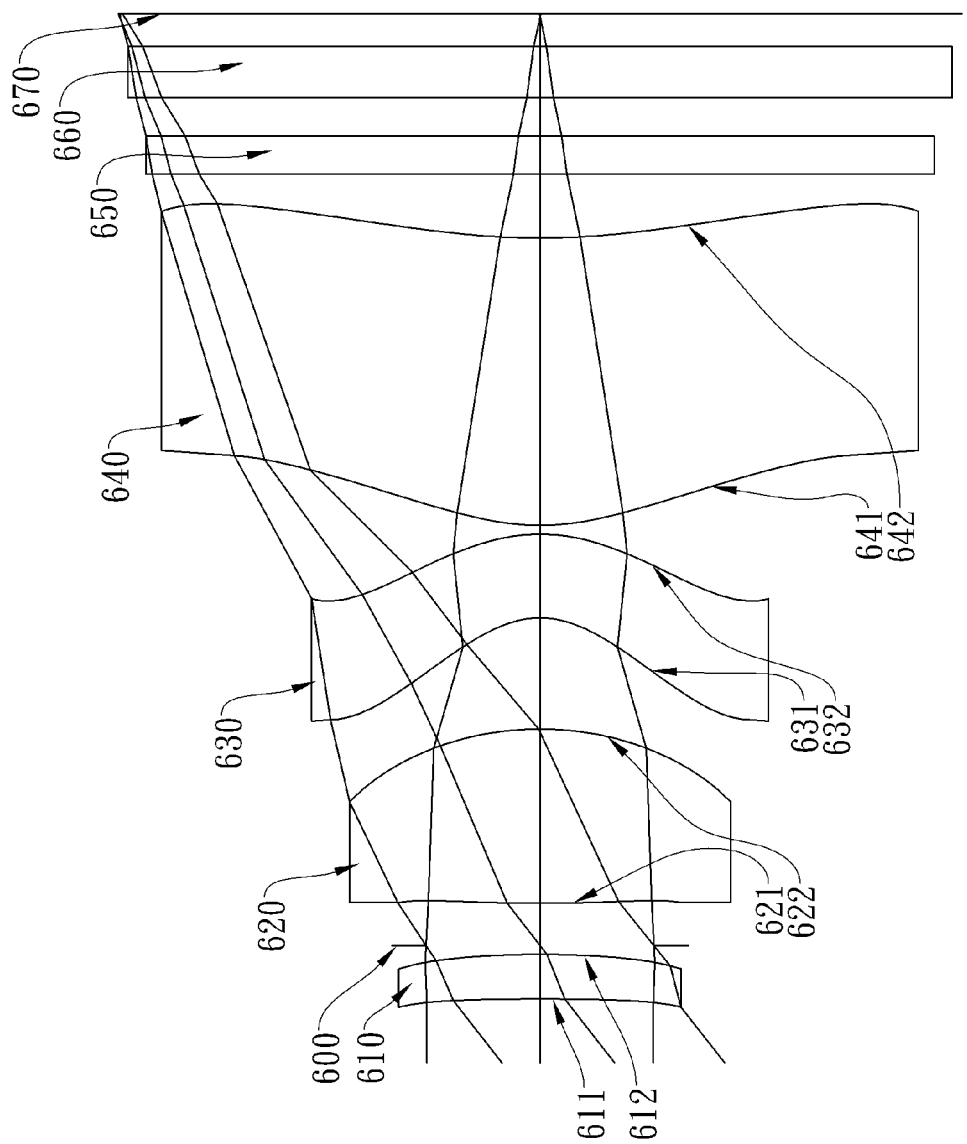
FIG. 6A shows an optical photographing system in accordance with a sixth embodiment of the present invention.
Figure 6B:
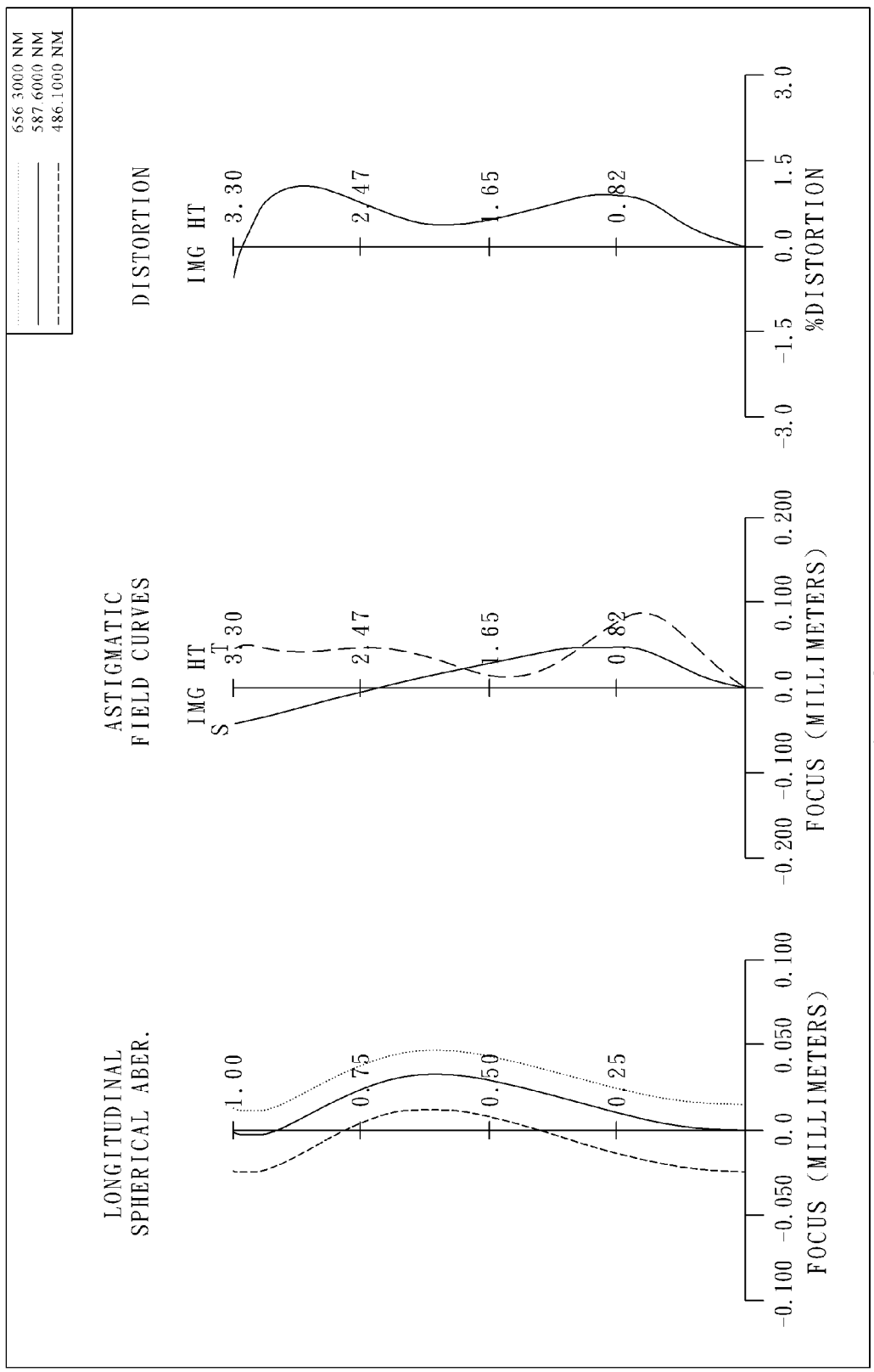
FIG. 6B shows the aberration curves of the sixth embodiment of the present invention.

FIG. 6A shows an optical photographing system in accordance with a sixth embodiment of the present invention, and FIG. 6B shows the aberration curves of the sixth embodiment of the present invention. The optical photographing system of the sixth embodiment of the present invention mainly comprises four lens elements, in order from an object side to an image side:

a plastic first lens element 610 with positive refractive power having a concave object-side surface 611 and a convex image-side surface 612, and the object-side and image-side surfaces 611 and 612 thereof being aspheric;

a plastic second lens element 620 with positive refractive power having a convex object-side surface 621 and a convex image-side surface 622, the object-side and image-side surfaces 621 and 622 thereof being aspheric;

a plastic third lens element 630 with negative refractive power having a concave object-side surface 631 and a convex image-side surface 632, the object-side and image-side surfaces 631 and 632 thereof being aspheric, and at least one inflection point is formed on both the object-side and image-side surfaces 631 and 632 thereof; and a plastic fourth lens element 640 with positive refractive power having a convex object-side surface 641 and a concave image-side surface 642, the object-side and image-side surfaces 641 and 642 thereof being aspheric, and at least one inflection point is form on both the object-side and image-side surfaces 641 and 642 thereof;

wherein an aperture stop 600 is disposed between the imaged object and the second lens element 620;

the optical photographing system further comprises an IR filter 650 disposed between the image-side surface 642 of the fourth lens element 640 and an image plane 670; a cover-glass 660 disposed between the IR filter 650 and the image plane 670; and an electronic sensor is further provided on the image plane 670; the IR filter 650 is made of glass and has no influence on the focal length of the optical photographing system.

The equation of the aspheric surface profiles of the sixth embodiment has the same form as that of the first embodiment.

In the sixth embodiment of the present optical photographing system, the focal length of the optical photographing system is f, and it satisfies the relation:

$f=4.28$ (mm).

In the sixth embodiment of the present optical photographing system, the f-number of the optical photographing system is Fno, and it satisfies the relation:

$Fno=2.40$.

In the sixth embodiment of the present optical photographing system, half of the maximal field of view of the optical photographing system is HFOV, and it satisfies the relation:

$HFOV=37.9$ deg.

In the sixth embodiment of the present optical photographing system, the Abbe number of the fourth lens element 640 is V4, the Abbe number of the third lens element 630 is V3, and they satisfy the relation:

$V4-V3=34.5$.

In the sixth embodiment of the present optical photographing system, the on-axis spacing between the first lens element 610 and the second lens element 620 is T12, the on-axis spacing between the third lens element 630 and the fourth lens element 640 is T34, the on-axis spacing between the second lens element 620 and the third lens element 630 is T23, and they satisfy the relation:

$(T12+T34)/T23=0.54$.

In the sixth embodiment of the present optical photographing system, the on-axis spacing between the first lens element 610 and the second lens element 620 is T12, the on-axis spacing between the second lens element 620 and the third lens element 630 is T23, and they satisfy the relation:

$T12/T23=0.46$.

In the sixth embodiment of the present optical photographing system, the thickness of the first lens element 610 on the optical axis is CT1, a thickness of the second lens element 620 on the optical axis is CT2, and they satisfy the relation:

$CT1/CT2=0.26$.

In the sixth embodiment of the present optical photographing system, the radius of curvature of the image-side surface 622 of the second lens element 620 is R4, a radius of curvature of the object-side surface 621 of the second lens element 620 is R3, and they satisfy the relation:

$|R4/R3|=0.18$.

In the sixth embodiment of the present optical photographing system, the radius of curvature of the object-side surface 631 of the third lens element 630 is R5, the radius of curvature of the image-side surface 632 of the third lens element 630 is R6, and they satisfy the relation:

$(R5+R6)/(R5-R6)=-2.87$.

In the sixth embodiment of the present optical photographing system, the focal length of the optical photographing system is f, the focal length of the first lens element 610 is f1, and they satisfy the relation:

$f/f1=0.25$.

In the sixth embodiment of the present optical photographing system, the focal length of the optical photographing system is f, the focal length of the second lens element 620 is f2, and they satisfy the relation:

$f/f2=1.11$.

In the sixth embodiment of the present optical photographing system, the focal length of the optical photographing system is f, the focal length of the third lens element 630 is f3, and they satisfy the relation:

$f/f3=-1.36$.

In the sixth embodiment of the present optical photographing system, the distance on the optical axis between the aperture stop 600 and the electronic sensor is SL, the distance on the optical axis between the object-side surface 611 of the first lens element 600 and the electronic sensor is TTL, and they satisfy the relation:

$SL/TTL=0.94$.

In the sixth embodiment of the present optical photographing system, the distance on the optical axis between the object-side surface 611 of the first lens element 610 and the image-side surface 642 of the fourth lens element 640 is Td, half of the diagonal length of the effective pixel area of the electronic sensor is ImgH, and they preferably satisfy the relation:

$Td/ImgH=1.81.$

The detailed optical data of the sixth embodiment is shown in FIG. 18 (TABLE 11), and the aspheric surface data is shown in FIG. 19 (TABLE 12), wherein the units of the radius of curvature, the thickness and the focal length are expressed in mm, and HFOV is half of the maximal field of view.

Embodiment 7

Figure 7A:
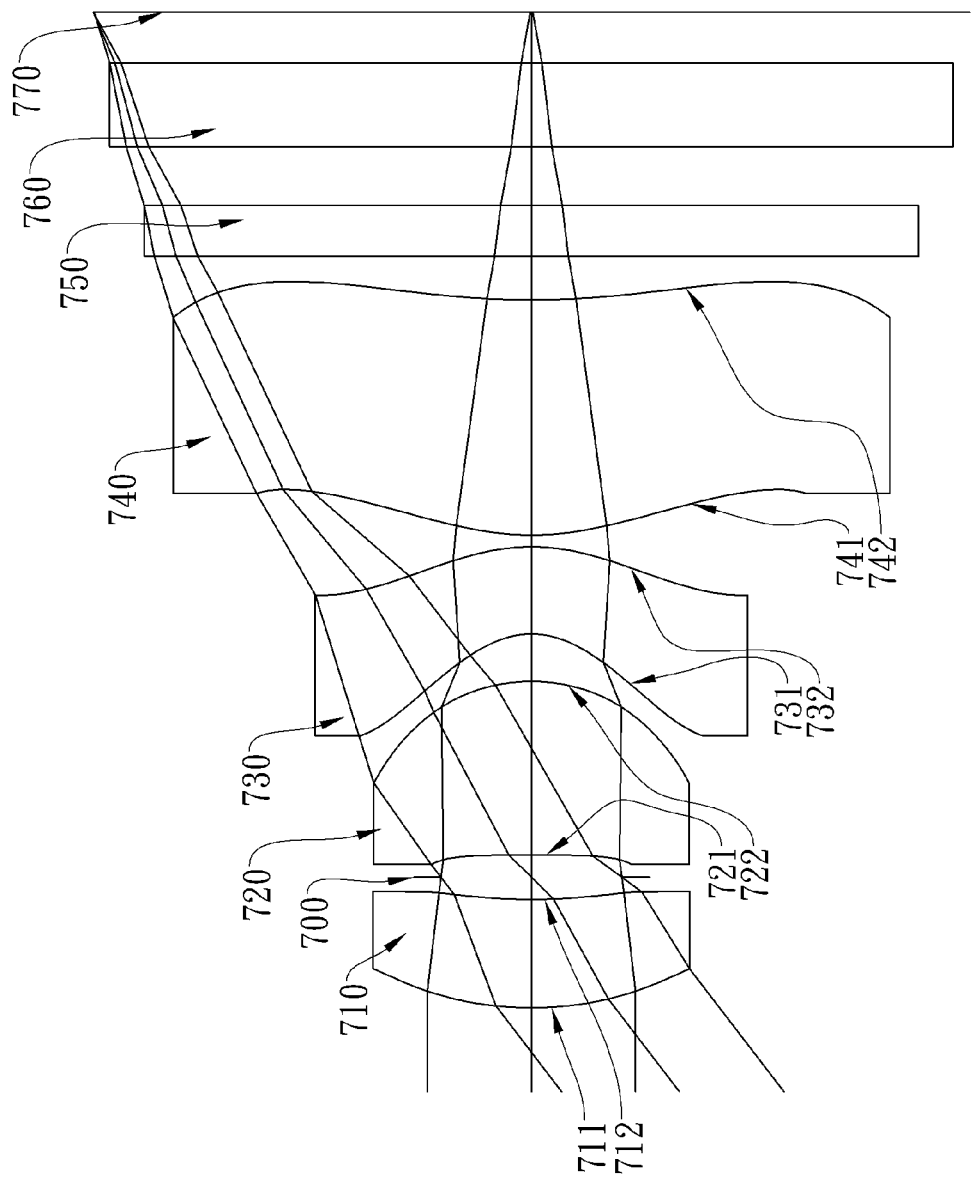
FIG. 7A shows an optical photographing system in accordance with a seventh embodiment of the present invention.
Figure 7B:
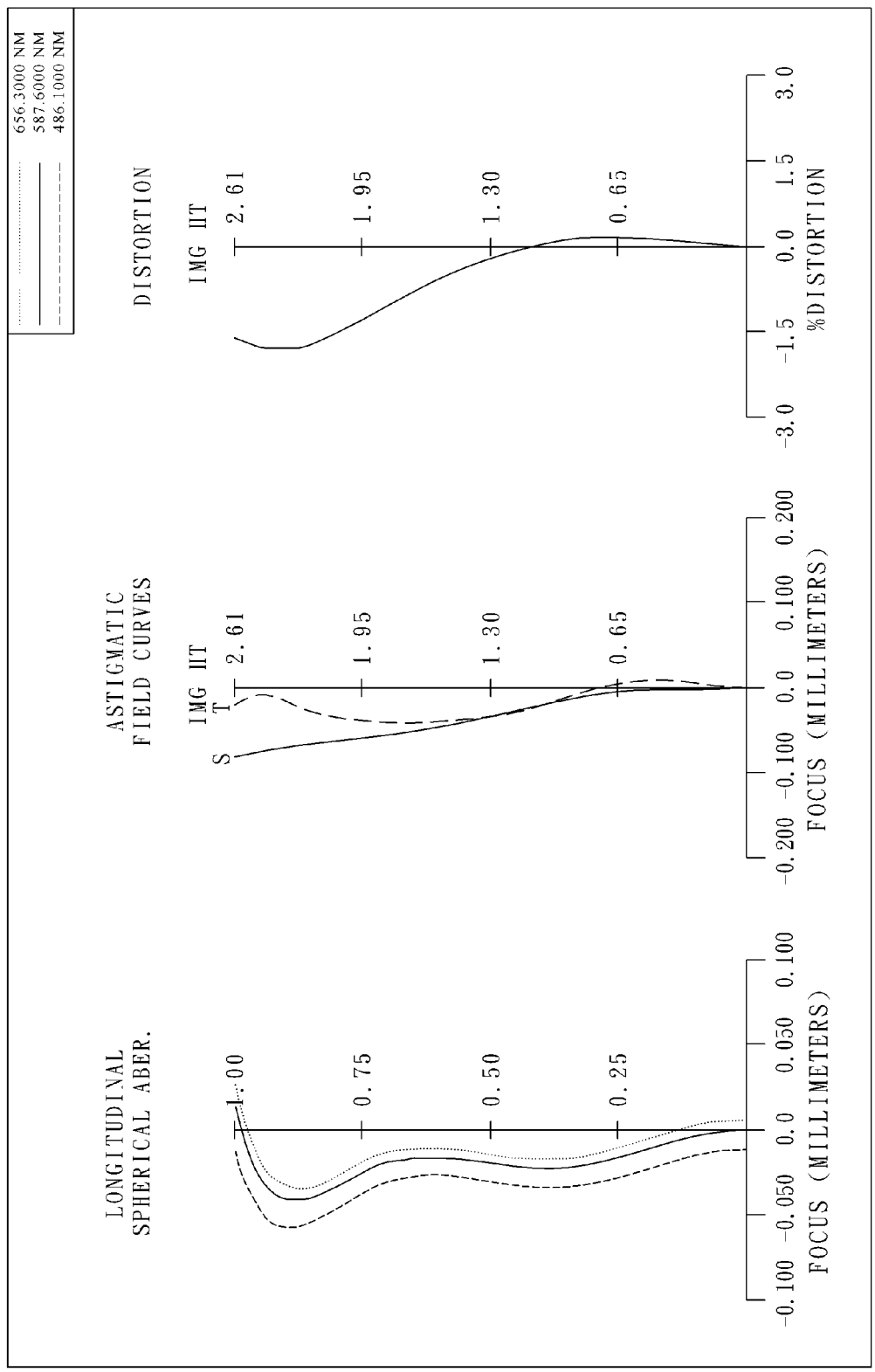
FIG. 7B shows the aberration curves of the seventh embodiment of the present invention.

FIG. 7A shows an optical photographing system in accordance with a seventh embodiment of the present invention, and FIG. 7B shows the aberration curves of the seventh embodiment of the present invention. The optical photographing system of the seventh embodiment of the present invention mainly comprises four lens elements, in order from an object side to an image side:

a plastic first lens element 710 with positive refractive power having a convex object-side surface 711 and a concave image-side surface 712, and the object-side and image-side surfaces 711 and 712 thereof being aspheric;

a plastic second lens element 720 with positive refractive power having a concave object-side surface 721 and a convex image-side surface 722, the object-side and image-side surfaces 721 and 722 thereof being aspheric;

a plastic third lens element 730 with negative refractive power having a concave object-side surface 731 and a convex image-side surface 732, the object-side and image-side surfaces 731 and 732 thereof being aspheric, and at least one inflection point is formed on both the object-side and image-side surfaces 731 and 732 thereof; and a plastic fourth lens element 740 with positive refractive power having a convex object-side surface 741 and a concave image-side surface 742, the object-side and image-side surfaces 741 and 742 thereof being aspheric, and at least one inflection point is form on both the object-side and image-side surfaces 741 and 742 thereof;

wherein an aperture stop 700 is disposed between the imaged object and the second lens element 720;

the optical photographing system further comprises an IR filter 750 disposed between the image-side surface 742 of the fourth lens element 740 and an image plane 770; a cover-glass 760 disposed between the IR filter 750 and the image plane 770; and an electronic sensor is further provided on the image plane 770; the IR filter 750 is made of glass and has no influence on the focal length of the optical photographing system.

The equation of the aspheric surface profiles of the seventh embodiment has the same form as that of the first embodiment.

In the seventh embodiment of the present optical photographing system, the focal length of the optical photographing system is f, and it satisfies the relation:

$f=3.46$ (mm).

In the seventh embodiment of the present optical photographing system, the f-number of the optical photographing system is Fno, and it satisfies the relation:

$Fno=2.81.$

In the seventh embodiment of the present optical photographing system, half of the maximal field of view of the optical photographing system is HFOV, and it satisfies the relation:

$HFOV=37.5$ deg.

In the seventh embodiment of the present optical photographing system, the Abbe number of the fourth lens element 740 is V4, the Abbe number of the third lens element 730 is V3, and they satisfy the relation:

$V4-V3=26.3.$

In the seventh embodiment of the present optical photographing system, the on-axis spacing between the first lens element 710 and the second lens element 720 is T12, the on-axis spacing between the third lens element 730 and the fourth lens element 740 is T34, the on-axis spacing between the second lens element 720 and the third lens element 730 is T23, and they satisfy the relation:

$(T12+T34)/T23=1.18.$

In the seventh embodiment of the present optical photographing system, the on-axis spacing between the first lens element 710 and the second lens element 720 is T12, the on-axis spacing between the second lens element 720 and the third lens element 730 is T23, and they satisfy the relation:

$T12/T23=0.93.$

In the seventh embodiment of the present optical photographing system, the thickness of the first lens element 710 on the optical axis is CT1, a thickness of the second lens element 720 on the optical axis is CT2, and they satisfy the relation:

$CT1/CT2=0.62.$

In the seventh embodiment of the present optical photographing system, the radius of curvature of the image-side surface 722 of the second lens element 720 is R4, a radius of curvature of the object-side surface 721 of the second lens element 720 is R3, and they satisfy the relation:

$|R4/R3|=0.02.$

In the seventh embodiment of the present optical photographing system, the radius of curvature of the object-side surface 731 of the third lens element 730 is R5, the radius of curvature of the image-side surface 732 of the third lens element 730 is R6, and they satisfy the relation:

$(R5+R6)/(R5-R6)=-2.38.$

In the seventh embodiment of the present optical photographing system, the focal length of the optical photographing system is f, the focal length of the first lens element 710 is f1, and they satisfy the relation:

$f/f1=0.40.$

In the seventh embodiment of the present optical photographing system, the focal length of the optical photographing system is f, the focal length of the second lens element 720 is f2, and they satisfy the relation:

$f/f2=1.70.$

In the seventh embodiment of the present optical photographing system, the focal length of the optical photographing system is f, the focal length of the third lens element 730 is f3, and they satisfy the relation:

$f/f3=-1.79.$

In the seventh embodiment of the present optical photographing system, the distance on the optical axis between the aperture stop 700 and the electronic sensor is SL, the distance on the optical axis between the object-side surface 711 of the first lens element 700 and the electronic sensor is TTL, and they satisfy the relation:

$$SL/TTL=0.86.$$

In the seventh embodiment of the present optical photographing system, the distance on the optical axis between the object-side surface 711 of the first lens element 710 and the image-side surface 742 of the fourth lens element 740 is Td, half of the diagonal length of the effective pixel area of the electronic sensor is ImgH, and they preferably satisfy the relation:

$$Td/ImgH=1.62.$$

The detailed optical data of the seventh embodiment is shown in FIG. 20 (TABLE 13), and the aspheric surface data is shown in FIG. 21 (TABLE 14), wherein the units of the radius of curvature, the thickness and the focal length are expressed in mm, and HFOV is half of the maximal field of view.

It is to be noted that TABLES 1-14 (illustrated in FIGS. 8-21 respectively) show different data of the different embodiments, however, the data of the different embodiments are obtained from experiments. Therefore, any optical photographing system of the same structure is considered to be within the scope of the present invention even if it uses different data. The embodiments depicted above and the appended drawings are exemplary and are not intended to limit the scope of the present invention. TABLE 15 (illustrated in FIG. 22) shows the data of the respective embodiments resulting from the equations.

What is claimed is:

1. An optical photographing system comprising four lens elements with refractive power, in order from an object side to an image side:
   a first lens element;
   a second lens element with positive refractive power, and at least one of the object-side and image-side surfaces thereof being aspheric;
   a third lens element with negative refractive power having a concave object-side surface and a convex image-side surface, and both of the object-side and image-side surfaces thereof being aspheric; and
   a fourth lens element with positive refractive power, and both of the object-side and image-side surfaces thereof being aspheric;
   wherein the optical photographing system further comprises an aperture stop and an electronic sensor positioned on an image plane where an object is imaged, and the aperture stop is positioned between an object and the second lens element;
   wherein a distance on the optical axis between the object-side surface of the first lens element and the image-side surface of the fourth lens element is Td, half of the diagonal length of the effective pixel area of the electronic sensor is ImgH, an on-axis spacing between the first lens element and the second lens element is T12, an on-axis spacing between the third lens element and the fourth lens element is T34, an on-axis spacing between the second lens element and the third lens element is T23, a radius of curvature of the image-side surface of the second lens element is R4, a radius of curvature of the object-side surface of the second lens element is R3, a distance on the optical axis between the aperture stop and the image plane is SL, a distance on the optical axis between the object-side surface of the first lens element and the image plane is TTL, and they satisfy the relation:

$$0.7<Td/ImgH<2.0;$$

$$1.5<(T12+T34)/T23<1.20;$$

$$0.0<|R4/R3|<1.55; \text{ and}$$

$$0.8<SL/TTL<1.2.$$

2. The optical photographing system according to claim 1, wherein the second lens element has a convex image-side surface, and the fourth lens element has a convex object-side surface.

3. The optical photographing system according to claim 2, wherein at least one inflection point is formed on at least one of the object-side and image-side surfaces of the third lens element, and at least one inflection point is formed on at least one of the object-side and image-side surfaces of the fourth lens element.

4. The optical photographing system according to claim 3, wherein the third lens element is made of plastic, and the fourth lens element is made of plastic.

5. The optical photographing system according to claim 4, wherein the first lens element has a convex object-side surface.

6. The optical photographing system according to claim 5, wherein a focal length of the optical photographing system is f, a focal length of the first lens element is f1, and they satisfy the relation:

$$0.0<|f/f1|<0.5.$$

7. The optical photographing system according to claim 6, wherein an on-axis spacing between the first lens element and the second lens element is T12, an on-axis spacing between the third lens element and the fourth lens element is T34, an on-axis spacing between the second lens element and the third lens element is T23, and they satisfy the relation:

$$0.2<(T12+T34)/T23<0.6.$$

8. The optical photographing system according to claim 6, wherein a thickness of the first lens element on the optical axis is CT1, a thickness of the second lens element on the optical axis is CT2, and they satisfy the relation:

$$0.2<CT1/CT2<0.5.$$

9. The optical photographing system according to claim 6, wherein a radius of curvature of the image-side surface of the second lens element is R4, a radius of curvature of the object-side surface of the second lens element is R3, and they satisfy the relation:

$$0.0<|R4/R3|<0.8.$$

10. The optical photographing system according to claim 4, wherein a focal length of the optical photographing system is f, a focal length of the second lens element is f2, a distance on the optical axis between the aperture stop and the image plane is SL, a distance on the optical axis between the object-side surface of the first lens element and the image plane is TTL, and they satisfy the relation:

$$1.0<f/f2<2.5; \text{ and}$$

$$0.84<SL/TTL<0.97.$$

11. The optical photographing system according to claim 10, wherein a radius of curvature of the object-side surface of the third lens element is R5, a radius of curvature of the image-side surface of the third lens element is R6, and they satisfy the relation:

$-5.0 < (R5+R6)/(R5-R6) < -2.0$.

12. The optical photographing system according to claim 10, wherein a focal length of the optical photographing system is f, a focal length of the third lens element is f3, and they satisfy the relation:

$-2.5 < f/f3 < -1.0$.

13. The optical photographing system according to claim 10, wherein at least one inflection point is formed on at least one of the object-side and image-side surfaces of the first lens element.

14. The optical photographing system according to claim 3, wherein an Abbe number of the fourth lens element is V4, an Abbe number of the third lens element is V3, and they satisfy the relation:

$25 < V4-V3 < 42$.

15. The optical photographing system according to claim 14, wherein a thickness of the first lens element on the optical axis is CT1, a thickness of the second lens element on the optical axis is CT2, and they satisfy the relation:

$2 < CT1/CT2 < 0.5$.

16. The optical photographing system according to claim 15, wherein an on-axis spacing between the first lens element and the second lens element is T12, an on-axis spacing between the third lens element and the fourth lens element is T34, an on-axis spacing between the second lens element and the third lens element is T23, and they satisfy the relation:

$0.2 < (T12+T34)/T23 < 0.6$.

17. An optical photographing system comprising four lens elements with refractive power, in order from an object side to an image side:
  a first lens element having a convex object-side surface and a concave image-side surface;
  a second lens element with positive refractive power having a convex image-side surface, and at least one of the object-side and image-side surfaces thereof being aspheric;
  a third lens element with negative refractive power having a concave object-side surface and a convex image-side surface, both of the object-side and image-side surfaces thereof being aspheric, and the third lens element is made of plastic; and
  a fourth lens element with positive refractive power having a convex object-side surface and a concave image-side surface, both of the object-side and image-side surfaces thereof being aspheric, the fourth lens element is made of plastic, and at least one inflection point is formed on at least one of the object-side and image-side surfaces thereof;
  wherein the optical photographing system further comprises an aperture stop and an electronic sensor positioned on an image plane where an object is imaged, and the aperture stop is positioned between an object and the second lens element;
  wherein a distance on the optical axis between the object-side surface of the first lens element and the image-side surface of the fourth lens element is Td, half of the diagonal length of the effective pixel area of the electronic sensor is ImgH, a distance on the optical axis between the aperture stop and the image plane is SL, a distance on the optical axis between the object-side surface of the first lens element and the image plane is TTL, an on-axis spacing between the first lens element and the second lens element is T12, an on-axis spacing between the second lens element and the third lens element is T23, and they satisfy the relation:

$0.7 < Td/ImgH < 2.0$;

$0.8 < SL/TTL < 1.2$; and $0.1 < T12/T23 < 1.0$.

18. The optical photographing system according to claim 17, wherein a focal length of the optical photographing system is f, a focal length of the second lens element is f2, and they satisfy the relation:

$1.0 < f/f2 < 2.5$.

19. The optical photographing system according to claim 18, wherein a focal length of the optical photographing system is f, a focal length of the first lens element is f1, and they satisfy the relation:

$0.0 < f/f1 < 0.5$.

20. The optical photographing system according to claim 18, wherein a radius of curvature of the image-side surface of the second lens element is R4, a radius of curvature of the object-side surface of the second lens element is R3, and they satisfy the relation:

$0.0 < |R4/R3| < 0.8$.

21. The optical photographing system according to claim 18, wherein a thickness of the first lens element on the optical axis is CT1, a thickness of the second lens element on the optical axis is CT2, and they satisfy the relation:

$0.2 < CT1/CT2 < 0.5$.

* * * * *

UNITED STATES PATENT AND TRADEMARK OFFICE
CERTIFICATE OF CORRECTION

PATENT NO. : 8,014,080 B1
APPLICATION NO. : 12/953747
DATED : September 6, 2011
INVENTOR(S) : Chun Shan Chen et al.

It is certified that error appears in the above-identified patent and that said Letters Patent is hereby corrected as shown below:

Column 24, Line 6:

"$1.5 < (T12+T34)/T23 < 1.20;$" should read

--$0.15 < (T12+T34)/T23 < 1.20;$--

Signed and Sealed this
First Day of November, 2011

David J. Kappos
*Director of the United States Patent and Trademark Office*